(12) United States Patent
Matsutani et al.

(10) Patent No.: US 9,319,591 B2
(45) Date of Patent: Apr. 19, 2016

(54) DISPLAY CONTROL DEVICE, DISPLAY CONTROL METHOD, PROGRAM, AND IMAGING APPARATUS

(71) Applicant: Sony Corporation, Minato-ku (JP)

(72) Inventors: Atsushi Matsutani, Tokyo (JP); Akira Sassa, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/266,974

(22) Filed: May 1, 2014

(65) Prior Publication Data

US 2014/0368718 A1      Dec. 18, 2014

(30) Foreign Application Priority Data

Jun. 17, 2013 (JP) .................................. 2013-126941

(51) Int. Cl.
*H04N 5/232* (2006.01)

(52) U.S. Cl.
CPC ....... *H04N 5/23293* (2013.01); *H04N 5/23222* (2013.01)

(58) Field of Classification Search
CPC .................................................. H04N 5/23222
USPC ..................................................... 348/333.02
See application file for complete search history.

(56) References Cited

U.S. PATENT DOCUMENTS

| | | | | |
|---|---|---|---|---|
| 8,692,907 | B2* | 4/2014 | Arai | 348/239 |
| 8,704,929 | B2* | 4/2014 | Imai | 348/333.01 |
| 2009/0278958 | A1* | 11/2009 | Bregman-Amitai et al. | 348/231.99 |
| 2010/0110266 | A1* | 5/2010 | Lee et al. | 348/333.02 |
| 2011/0090390 | A1* | 4/2011 | Narita | H04N 5/23219 348/333.03 |

FOREIGN PATENT DOCUMENTS

JP      2002-010114      1/2002

OTHER PUBLICATIONS

Nakamura et al., WO 2010/027080, WIPO.*
U.S. Appl. No. 14/278,147, filed May 15, 2014, Matsutani.

* cited by examiner

*Primary Examiner* — Anthony J Daniels
(74) *Attorney, Agent, or Firm* — Oblon, McClelland, Maier & Neustadt, L.L.P.

(57) ABSTRACT

A display control device includes: a composition determining unit that determines a plurality of recommended compositions of an input image; and a display controller that controls one recommended composition to be displayed distinguishably from other recommended compositions among the plurality of recommended compositions.

16 Claims, 14 Drawing Sheets

MOVEMENT OF IMAGING APPARATUS

DISPLAY CONTROL DEVICE, DISPLAY CONTROL METHOD, PROGRAM, AND IMAGING APPARATUS

CROSS REFERENCE TO RELATED APPLICATIONS

This application claims the benefit of Japanese Priority Patent Application JP 2013-126941 filed Jun. 17, 2013, the entire contents of which are incorporated herein by reference.

BACKGROUND

The present disclosure relates to a display control device, a display control method, a program, and an imaging apparatus.

An imaging apparatus having a function of displaying an appropriate composition on a display and prompting the user to image a subject in the composition is proposed. For example, Japanese Unexamined Patent Application Publication No. 2002-10114 discloses a technique of sequentially displaying plural images based on appropriate compositions.

SUMMARY

However, in the technique disclosed in Japanese Unexamined Patent Application Publication No. 2002-10114, it is necessary that the user learn the sequentially displayed plural compositions.

It is desirable to provide a display control device, a display control method, a program, and an imaging apparatus which are capable of solving the above-described problem.

According to an embodiment of the present disclosure, there is provided an display control device including: a composition determining unit that determines a plurality of recommended compositions of an input image; and a display controller that controls one recommended composition to be displayed distinguishably from other recommended compositions among the plurality of recommended compositions.

According to another embodiment of the present disclosure, there is provided a display control method including: allowing a composition determining unit to determine a plurality of recommended compositions of an input image; and allowing a display controller to control one recommended composition to be displayed distinguishably from other recommended compositions among the plurality of recommended compositions.

According to still another embodiment of the present disclosure, there is provided a program which allows a computer to execute a display control method, the display control method including: allowing a composition determining unit to determine a plurality of recommended compositions of an input image; and allowing a display controller to control one recommended composition to be displayed distinguishably from other recommended compositions among the plurality of recommended compositions.

According to still another embodiment of the present disclosure, there is provided an imaging apparatus including: an imaging unit; a composition determining unit that determines a plurality of recommended compositions of an input image acquired through the imaging unit; and a display controller that controls one recommended composition to be displayed distinguishably from other recommended compositions among the plurality of recommended compositions.

According to at least one of the embodiments, plural compositions can be displayed. Effects described in this specification are merely exemplary, and the content of the present disclosure is not limited thereto. In addition, effects different from the exemplary effects of the present disclosure may also be obtained.

BRIEF DESCRIPTION OF THE DRAWINGS

FIG. 2 is a diagram illustrating the example of the external appearance of the imaging apparatus according to the first embodiment or the like;

FIG. 3 is a block diagram illustrating an example of a configuration of the imaging apparatus according to the first embodiment or the like;

DETAILED DESCRIPTION OF EMBODIMENTS

Hereinafter, embodiment of the present disclosure will be described with reference to the accompanying drawings. The description will be made in the following order.

1. First Embodiment
2. Second Embodiment
3. Third Embodiment
4. Modification Example The embodiments described below are merely preferred specific examples of the present disclosure, and the content of the present disclosure is not limited to these embodiments.

1. First Embodiment

Example of External Appearance of Imaging Apparatus

Figure 1:
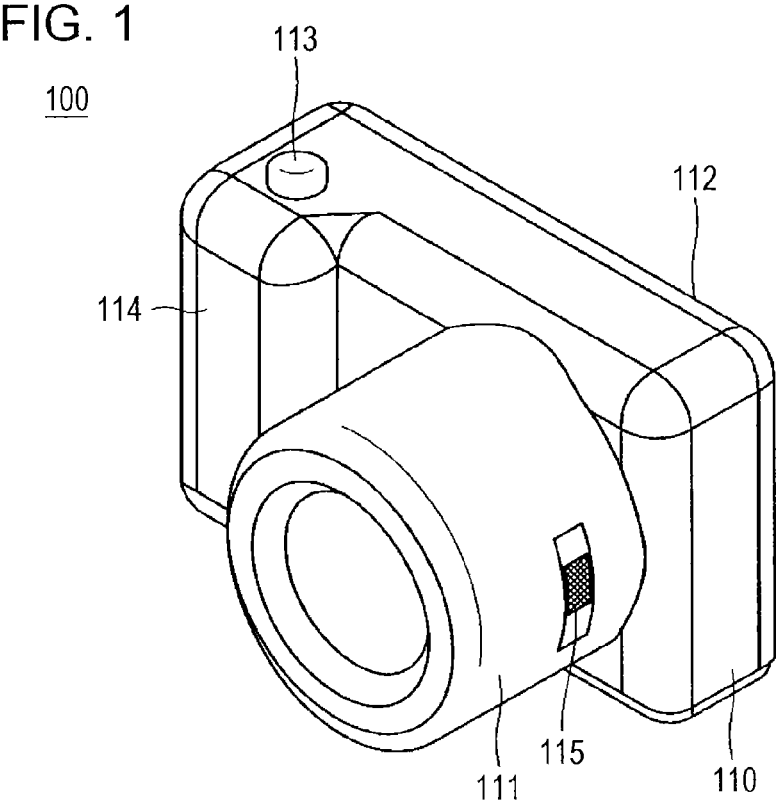
FIG. 1 is a diagram illustrating an example of an external appearance of an imaging apparatus according to a first embodiment or the like of the present disclosure.

FIG. 1 is a perspective view illustrating an example of an external appearance of an imaging apparatus to which a display control device is applied. The imaging apparatus 100 has, for example, a function of capturing a moving image and a still image. The imaging apparatus 100 includes, for example, a camera body 110, a lens barrel 111 in which a lens such as a zoom lens is equipped, a monitor 112, a shutter button (also referred to as "release button") 113, a grip portion 114, and a motor-driven zoom key 115.

The camera body 110 has, for example, a front surface, a back surface, a top surface, a bottom surface, a right side surface, and a left side surface. The expressions expressing the front, back, right, and left directions are used for convenience of description, and the content of the present disclosure is not limited to these directions. The lens barrel 111 is disposed on the front surface of the camera body 110. The monitor 112 is disposed on the back surface of the camera body 110. An end of the front surface of the camera body 110 slightly protrudes, and this protrusion and the right side surface of the camera body 110 form a grip portion 114. A shutter button 113 is disposed near the grip portion 114 on the top surface of the camera body 110. A motor-driven zoom key 115 is disposed on a peripheral surface of the lens barrel 111 so as to be, for example, vertically slidable. The motor-driven zoom key 115 may be disposed on the camera body 110.

The lens barrel 111 functions as a lens aperture through which light (optical image) reflected from a subject is input. Further, the lens barrel 111 also functions as an imaging optical system for guiding light reflected from a subject to an imaging device which is disposed inside the camera body 110. The lens barrel 111 can be unmounted from the camera body 110 by manipulating a lens exchange button or the like.

The lens barrel 111 includes a lens group including plural lenses which are sequentially disposed along an optical axis. The lens group includes, for example, a focus lens for adjusting the focus and a zoom lens for changing the magnification. When the motor-driven zoom key 115 is manipulated, the zoom lens is appropriately moved in an optical axis direction to perform optical zoom. For example, when optical zoom magnification reaches its limit, digital zoom is performed.

A rotatable ring may be formed on the peripheral surface of the lens barrel 111. By the user manually manipulating the ring, the zoom lens may be moved in the optical axis direction according to a rotating direction and a rotating amount of the ring. A zoom magnification corresponding to a position of the moved zoom lens is set. The lens barrel 111 may be provided with a focus adjusting ring. By the user rotating the ring, the focus lens may be moved to perform manual focusing.

The monitor 112 includes a liquid crystal display (LCD) and an organic electroluminescence (EL) panel. On the monitor 112, for example, a menu screen for setting functions of the imaging apparatus 100 and a reproduced image are displayed. Further, during the composition determining (framing) of a subject before imaging the subject, an image (through image) in the moving image mode is displayed on the monitor 112 (live view display).

The shutter button 113 can be pressed to be in, for example, both states including: "a half-pressed state" in which the shutter button 113 is pressed halfway; and "a fully-pressed state" in which the shutter button 113 is further pressed from the half-pressed state. When the shutter button 113 is half-pressed, a preparing operation for capturing a still image of a subject is performed. Examples of the preparing operation for capturing a still image of a subject include a detecting operation for detecting the setting an exposure control value and the focus and an emission operation of an auxiliary light unit. When the shutter button 113 is released from the half-pressed state, the preparing operation ends.

When the shutter button 113 is further pressed from the half-pressed state, that is, when the shutter button 113 is fully pressed, an instruction to image a subject is given, and an exposure operation relating to a subject image (an optical image of a subject) is performed using an imaging device. Image data obtained through the exposure operation is subjected to a predetermined image signal processing, and thus a still image is obtained. Image data corresponding to the obtained still image are appropriately stored in a recording device such as a memory card or a hard disc equipped in the imaging apparatus 100. When a moving image is captured, for example, a moving image is captured and recorded by pressing the shutter button 113, and the capturing of the moving image is stopped by pressing the shutter button 113 once more.

The grip portion 114 is a portion of the imaging apparatus 100 to be gripped by the user. In order to improve a fitting property, convex and concave portions are formed on the surface of the grip portion 114. For example, a battery housing chamber and a card housing chamber are formed inside the grip portion 114. In the battery housing chamber, a battery which is a power source of the imaging apparatus 100 is housed. As the battery, a secondary battery such as a lithium ion secondary battery may be used. Of course, a primary battery may also be used. In the card housing chamber, a memory card for storing image data or the like of a captured image is detachably housed. In the grip portion 114, a sensor or the like for detecting whether or not the grip portion 114 is griped may also be provided.

The motor-driven zoom key 115 is disposed, for example, on the peripheral surface of the lens barrel 111. The motor-driven zoom key 115 is, for example, vertically slidable. Among the up and down directions, one direction is set to a telescopic (T) side, and the other direction is set to a wide-angle (W) side. For example, the user of the imaging apparatus 100 can give an instruction to increase the zoom magnification by sliding the motor-driven zoom key 115 to the telescopic side and can give an instruction to decrease the zoom magnification by sliding the motor-driven zoom key 115 to the wide-angle side.

Figure 2:
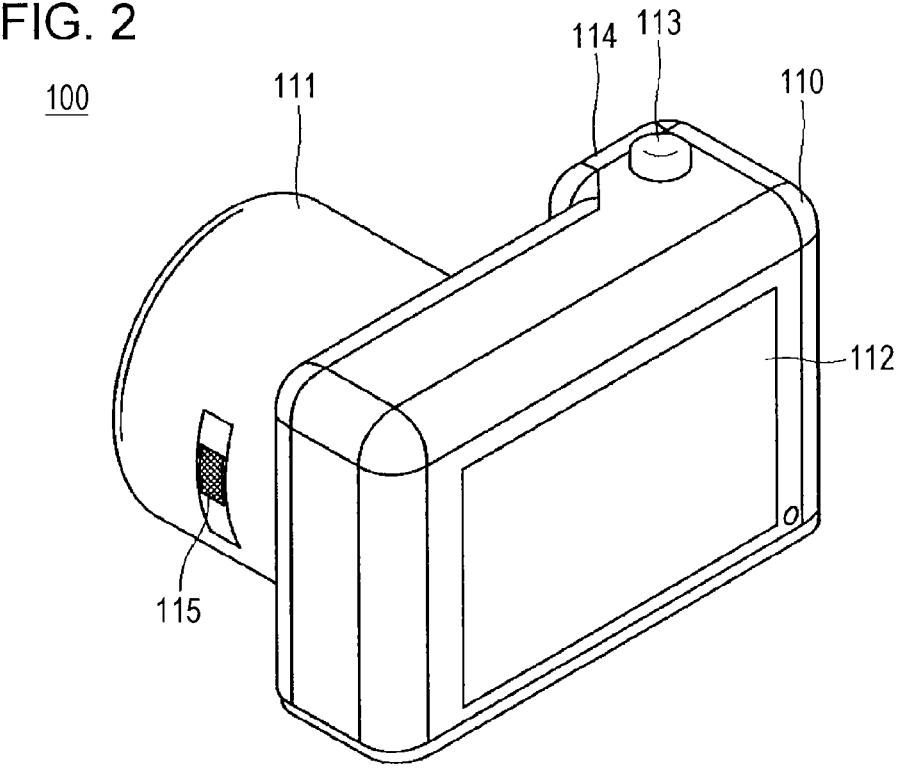

FIG. 2 is a perspective view illustrating the imaging apparatus 100 when seen from the back surface side. As described above, the monitor 112 is disposed on the back surface of the camera body 110. The monitor 112 may be mounted on the camera body 110, for example, through a hinge. The monitor 112 may be rotatably mounted through a hinge such that the direction of the monitor 112 can be changed. As a result, for example, the user of the imaging apparatus 100 can image himself or herself, that is, can take a so-called selfie.

Example of Electrical Configuration of Imaging Apparatus

Figure 3:
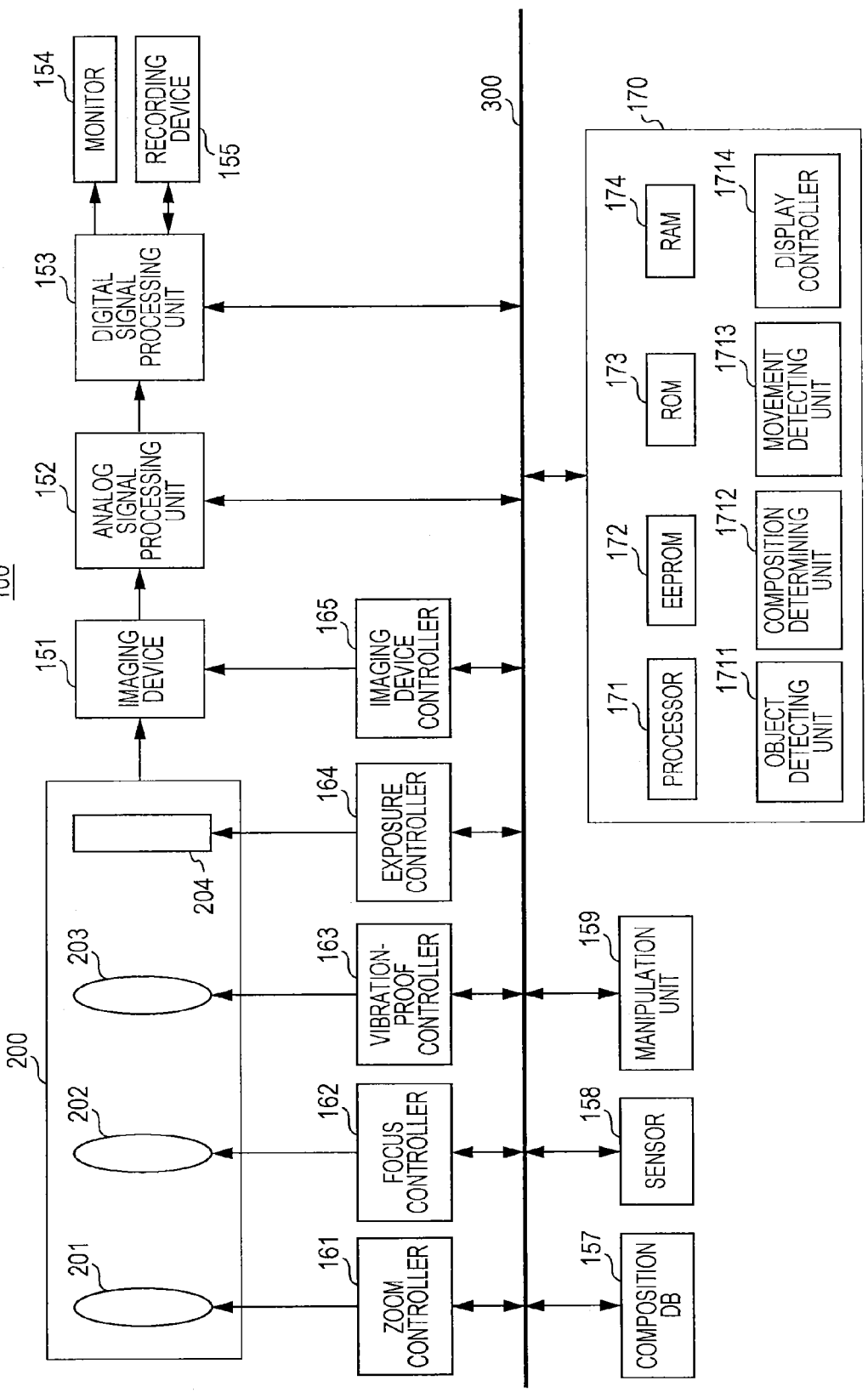

FIG. 3 is a block diagram illustrating an example of an electrical configuration of the imaging apparatus 100. The imaging apparatus 100 includes, for example, an imaging device 151, an analog signal processing unit 152, a digital signal processing unit 153, a monitor 154, a recording device 155, a composition database (DB) 157, a sensor 158, a manipulation unit 159, a controller 170, and a lens block 200. The monitor 154 corresponds to the monitor 112 illustrated in FIGS. 1 and 2.

The controller 170 includes, for example, a processor 171, an electrically erasable programmable read-only memory (EEPROM) 172, a read only memory (ROM) 173, and a random access memory (RAM) 174. In FIG. 3, as an example of a functional block of the processor 171, an object detecting unit 1711, a composition determining unit 1712, and a movement detecting unit 1713, and a display controller 1714 are illustrated.

The lens block 200 includes a zoom lens 201, a focus lens 202, a vibration-proof lens 203, and a diaphragm 204 (including a shutter) for adjusting the exposure. In FIG. 3, the zoom lens 201 or the like is illustrated as one lens. However, the zoom lens 201 may include plural lenses (a lens group) or may include plural lens groups. The arrangement state of the respective lenses can be appropriately changed.

The imaging apparatus 100 include control mechanisms that control the respective components of the lens block 200 and the imaging device 151, respectively. Specifically, the imaging apparatus 100 includes, for example, a zoom controller 161 that controls the zoom lens 201, a focus controller 162 that controls the focus lens 202, a vibration-proof controller 163 that controls the vibration-proof lens 203, an exposure controller 164 that controls the diaphragm 204, and an imaging device controller 165 that controls the imaging device 151.

The respective blocks of the imaging apparatus 100 are connected to each other through a bus 300. Data and commands are transmitted and received between the blocks through the bus 300. Hereinafter, each component of the imaging apparatus 100 will be described.

The lens block 200 is provided for forming an image relating to a subject on an image plane of the imaging device 151. The respective lenses configuring the lens block 200 are arranged substantially in a line along an optical axis of light (hereinafter, referred to as "subject light") reflected from a subject. "Being arranged substantially in a line" implies the arrangement in which the light which has passed through the lens block 200 can be incident on the imaging device 151. In this arrangement, the centers of the respective lenses and the center of the imaging device 151 are not necessarily arranged in the same line. The lens block 200 may include a mirror device for reflecting a part of the subject light in a predetermined direction.

The focal length is changed by moving a position of the zoom lens 201 in the optical axis direction, and thus zoom to the subject can be adjusted. The zoom lens 201 is displaced under the control of the zoom controller 161. The zoom controller 161 includes, for example, a drive mechanism such as a stepping motor that drives the zoom lens 201; and a microcomputer.

This microcomputer can communicate with the processor 171 of the controller 170 through the bus 300. For example, through this communication, a zoom lens control signal is supplied from the processor 171 to the microcomputer of the zoom controller 161. Based on the zoom lens control signal, the driving mechanism of the zoom controller 161 operates to move the zoom lens 201 to a position corresponding to the zoom lens control signal. Further, through this communication, position information regarding the position of the zoom lens 201 is supplied from the zoom controller 161 to the processor 171.

By moving the position of the focus lens 202 in the optical axis direction, the focus on a subject can be adjusted. The focus controller 162 includes, for example, a drive mechanism such as a stepping motor that drives the focus lens 202; and a microcomputer.

This microcomputer can communicate with the processor 171 through the bus 300. For example, through this communication, a focus lens control signal is supplied from the processor 171 to the microcomputer of the focus controller 162. Based on the focus lens control signal, the driving mechanism of the focus controller 162 operates to move the focus lens 202 to a position corresponding to the focus lens control signal. Further, through this communication, position information regarding the position of the focus lens 202 is supplied from the focus controller 162 to the processor 171.

The vibration-proof lens 203 performs shaking correction. For example, correction information regarding shaking correction is generated by the processor 171 based on sensor information supplied from the sensor 158 such as a gyro sensor. The correction information is supplied from the processor 171 to the vibration-proof controller 163, the vibration-proof lens 203 is displaced under the control of the vibration-proof controller 163, and thus optical shaking correction is performed. The shaking correction is not limited to the optical shaking correction, and may be performed by signal processing of image data or by a combination of the above-described methods.

The diaphragm 204 adjusts the intensity of the subject light incident on the imaging device 151. The exposure controller 164 operates, for example, under the control of the processor 171 to control the opening and closing of an aperture, a shutter, or the like included in the diaphragm 204 and control an aperture value, a shutter speed, or the like to appropriate values.

The imaging device 151 is, for example, a sensor in which imaging elements are two-dimensionally arranged. As the imaging device 151, for example, a complementary metal oxide semiconductor (CMOS) image sensor which performs exposure at different times for each pixel may be used. As the imaging device 151, a charge coupled device (CCD) or other image sensors may also be used. For example, the imaging device 151 and the lens block 200 form an imaging unit. It may be considered that the imaging unit includes the imaging device 151; and the analog signal processing unit 152 and the digital signal processing unit 153 of the subsequent stage.

For example, the imaging device 151 images a subject in synchronization with a period of a vertical synchronizing signal and converts an optical image of the subject, which is incident through the lens block 200 and a primary color filter (not illustrated) provided on the front surface of and the imaging device 151, into imaging signals. The imaging device 151 outputs the generated imaging signals to the analog signal processing unit 152. The imaging device 151 performs the generation of imaging signals and the like under the control of the imaging device controller 165. For example, the imaging device 151 generates imaging signals at a time set by the imaging device controller 165.

For example, the imaging device controller 165 operates under the control of the processor 171 to control the imaging device 151. The imaging device controller 165 controls the imaging device 151 to convert an optical image of a subject, which is incident through the lens block 200 and the primary filter, into imaging signals or to drive an electronic shutter. The imaging device controller 165 may move the imaging device 151 to an appropriate position under the control of the processor 171 to perform shaking correction.

The analog signal processing unit 152 performs correlated double sampling (CDS) on analog image data supplied from the imaging device 151 to improve a signal-to-noise (S/N) ratio. Further, the analog signal processing unit 152 performs automatic gain control (AGC) to control the gain and performs an existing analog signal processing. The analog image data which is subjected to the analog signal processing by the analog signal processing unit 152 is supplied to the digital signal processing unit 153.

The digital signal processing unit 153 is, for example, a digital signal processor (DSP). The digital signal processing unit 153 performs a predetermined digital image processing.

Examples of the digital image processing include Y/C separation, white balancing, interpolating, gamma correction, color correction, contour correction, tone reproduction, and noise reduction. In addition, the digital signal processing unit 153 has a converting function and appropriately converts image data from analog signals to digital signals or from digital signals to analog signals. The digital image data which is processed by the digital signal processing unit 153 is optionally supplied to the controller 170 through the bus 300.

The image data which is processed by the digital signal processing unit 153 is supplied to, for example, the monitor 154, and the monitor 154 performs display based on the image data. The image data is generated and displayed, for example, per 1/30 seconds. The monitor 154 includes a display panel such as an LCD or an organic EL panel and a driver that drives the display panel. The monitor 154 displays, in addition to the image data, a menu screen for performing various settings of the imaging apparatus 100.

The image data which is processed by the digital signal processing unit 153 is supplied to, for example, the recording device 155 and is recorded on the recording device 155. For example, when the image data is moving image data, the image data which is processed by the digital signal processing unit 153 is compressed using a compression encoding format such as advanced video codec high definition (AVCHD; trademark), and the compressed data is recorded on the recording device 155. When the imaging apparatus 100 can capture a still image, the still image data is compressed using a compression encoding format such as joint photographic experts group (JPEG), and the compressed data is recorded on the recording device 155.

The recording device 155 is at least one of a recording device equipped in the imaging apparatus 100 and a recording device detachable from the imaging apparatus 100. Examples of the recording device 155 include a hard disc, a flash memory, an optical disc, and a magneto-optic disc. Image data which is obtained by imaging a subject is recorded on the recording device 155 under the control of the digital signal processing unit 153. For example, whether the image data is stored on an internal memory or an external memory can be arbitrarily set by the user.

The composition DB 157 stores image data of composition frames indicating compositions, image data of relevant information relating to a main recommended composition described below, and the like. The composition DB 157 may have the same configuration as that of the recording device 155 or the RAM 174.

The sensor 158 is, for example, a gyro sensor. The sensor information obtained by the sensor 158 is supplied to the processor 171 of the controller 170. The processor 171 can discriminate the movement of the imaging apparatus 100 using the sensor information.

The manipulation unit 159 is a collective term for input mechanisms provided in the imaging apparatus 100 such as buttons, dials, or switches. When the user manipulates the manipulation unit 159, various settings of the imaging apparatus 100, the imaging operation, and the like can be performed. In this example, the above-described monitor 154 is a touch screen (touch panel), and the monitor 154 functions as the manipulation unit 159. The imaging apparatus 100 may be manipulated by voice. The above-described motor-driven zoom key 115 configures a part of the manipulation unit 159. The manipulation unit 159 is not limited to a physical key and may be a key displayed on the monitor 154.

When the manipulation unit 159 is manipulated, a manipulating signal is generated. The generated manipulating signal is supplied to the processor 171 through the bus 300. The processor 171 performs the control based on the supplied manipulating signal.

The controller 170 controls the respective components of the imaging apparatus 100 and includes the processor 171 such as a central processing unit (CPU), the EEPROM 172, the ROM 173, and the RAM 174. The processor 171 generates control commands for controlling the respective components of the imaging apparatus 100 and performs various kinds of arithmetic processing.

When the EEPROM 172 or the RAM 174 is used as a temporary storage area of work memory or data and as a storage of various histories during the operation of the processor 171. In the ROM 173, for example, a program which is executed by the processor 171 is stored. Although not illustrated in the drawings, the imaging apparatus 100 may include, for example, a sound pickup microphone or a speaker for reproducing a voice.

Example of Function of Processor

An example of a function of the processor 171 will be described. The function of the processor 171 described below is merely exemplary, and the processor 171 may include a different function from the exemplary function.

The processor 171 functions as, for example, the object detecting unit 1711, the composition determining unit 1712, the movement detecting unit 1713, and the display controller 1714. Of course, other processors for realizing these functions may be provided independent of the processor 171 such that data or the like are transmitted and received between the processors.

The object detecting unit 1711 detects an object from an input image. The object is, for example, a subject such as a human face, a mountain, or a flower. The object detecting unit 1711 detects an object using a detecting method corresponding to the object. For example, the object detecting unit 1711 detects a face by detecting a skin color from an input image or detects a face using a difference in the brightness of the face. In addition, the object detecting unit 1711 detects an object and determines the kind of the object by detecting an edge of an input image and comparing the obtained edge to a predetermined pattern.

The composition determining unit 1712 determines compositions of an input image. For example, the input image is an image which is supplied to the RAM 174 through the bus 300 to be temporarily stored (recorded) on the RAM 174 after being subjected to the digital signal processing by the digital signal processing unit 153.

When plural compositions are obtained as a result of the determination, the composition determining unit 1712 selects appropriate compositions among the plural compositions and sets the selected compositions as recommended compositions. When the plural recommended compositions are set, the composition determining unit 1712 selects, for example, one recommended composition among the plural recommended compositions. In the following description, the one recommended composition will be referred to as "main recommended composition". The term "main" is used for convenience of description and does not limit the content of the present disclosure.

The composition determining unit 1712 determines compositions based on, for example, the object detected by the object detecting unit 1711. A method of setting compositions can be appropriately modified. However, in this embodiment, so-called the rule of thirds is used for determining compositions. In the rule of thirds, the monitor 154 is horizontally and vertically divided into three parts, respectively (the monitor 154 is divided into nine parts in total), and the above-described object is positioned at an intersection of dividing lines or near the intersection. Of course, other methods (for example, rule of fourths) may be used for setting compositions. In addition, the user may set a preferred method of determining compositions among plural methods of determining compositions.

The movement detecting unit 1713 detects the movement of the imaging apparatus 100 based on the sensor information supplied from the sensor 158. The movement detecting unit 1713 may detect the movement of the imaging apparatus 100 based on not the sensor information but changes of the input image or using a combination of the above-described detecting methods. For example, whether or not the imaging apparatus 100 is moved and the movement direction may be detected by storing plural input images on the RAM 174 and detecting a movement vector using the input images.

The display controller 1714 controls the display on the monitor 154. For example, recommended composition frames (hereinafter, simply abbreviated as "recommended compositions") indicating the recommended compositions determined by the composition determining unit 1712 are superimposed on the through image, and the superimposed image is displayed on the monitor 154. At this time, the display controller 1714 controls the main recommended composition to be displayed on the monitor 154 distinguishably from other recommended compositions.

In addition, the display controller 1714 controls the display based on the movement information supplied from the movement detecting unit 1713. For example, when there is a predetermined amount or greater of movement in a predetermined direction, the display controller 1714 sets a recommended composition, which is positioned in a direction corresponding to the predetermined direction, to a main recommended composition, sets the previous main recommended composition to a recommended composition, and controls the display according to the setting result.

Example of Display in First Embodiment

Figure 4:
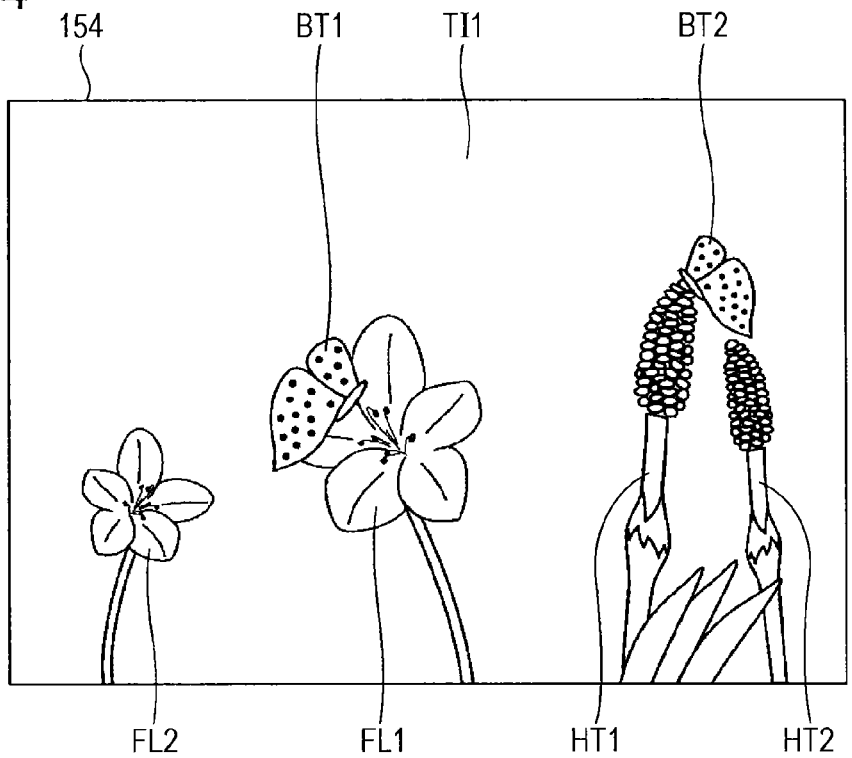
FIG. 4 is a diagram illustrating a display example of a monitor according to the first embodiment.

FIG. 4 illustrates an example of a through image displayed on the monitor 154. For example, a through image TI1 is displayed on the monitor 154, the through image TI1 including: a flower FL1 that is positioned near the center; a flower FL2 that is positioned on the left of the monitor 154; a field horsetail HT1 and a field horsetail HT2 that are positioned on the right side of the monitor 154; a butterfly BT1 that stays on the flower FL1; and a butterfly BT2 that stays on a tip end of the field horsetail HT1.

The object detecting unit 1711 detects the flower FL1 and the like. Based on the detection result by the object detecting unit 1711, the composition determining unit 1712 determines recommended compositions. The composition determining unit 1712 sets recommended compositions such that the butterfly BT1, for example, is positioned at an appropriate position in a composition according to the rule of thirds. In addition, the composition determining unit 1712 sets recommended compositions such that the butterfly BT2, for example, is positioned at an appropriate position in a composition according to the rule of thirds. The recommended compositions determined by the composition determining unit 1712 is superimposed on the through image TI1, and the superimposed image is displayed.

Figure 5:
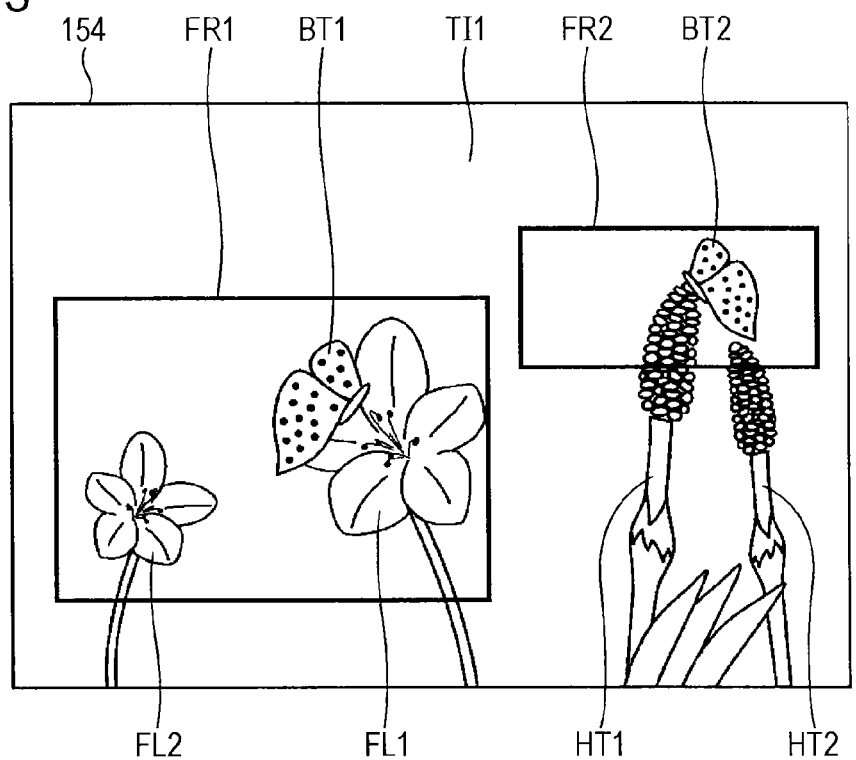
FIG. 5 is a diagram illustrating a display example of the monitor according to the first embodiment.

FIG. 5 illustrates an example of the recommended compositions superimposed on the through image TI1. For example, a recommended composition FR1 and a recommended composition FR2 are set on the through image TI1. In this example, the recommended composition FR1 is set to a main recommended composition (hereinafter, the recommended composition FR1 will be referred to as the main recommended composition FR1). In the first embodiment, a composition close to the center of the through image (the center of the monitor 154) is set to a default main recommended composition. Of course, the main recommended composition may be set using other methods. For example, a composition having a largest frame size among recommended compositions may be set as the main recommended composition.

The main recommended composition and the recommend compositions are set, for example, whenever the through image is input to the RAM 174. Alternatively, the main recommended composition and the recommend compositions may be set when the amount of the movement of the imaging apparatus 100, which is obtained based on the movement information of the sensor 158, is a predetermined value or greater.

Figure 6:
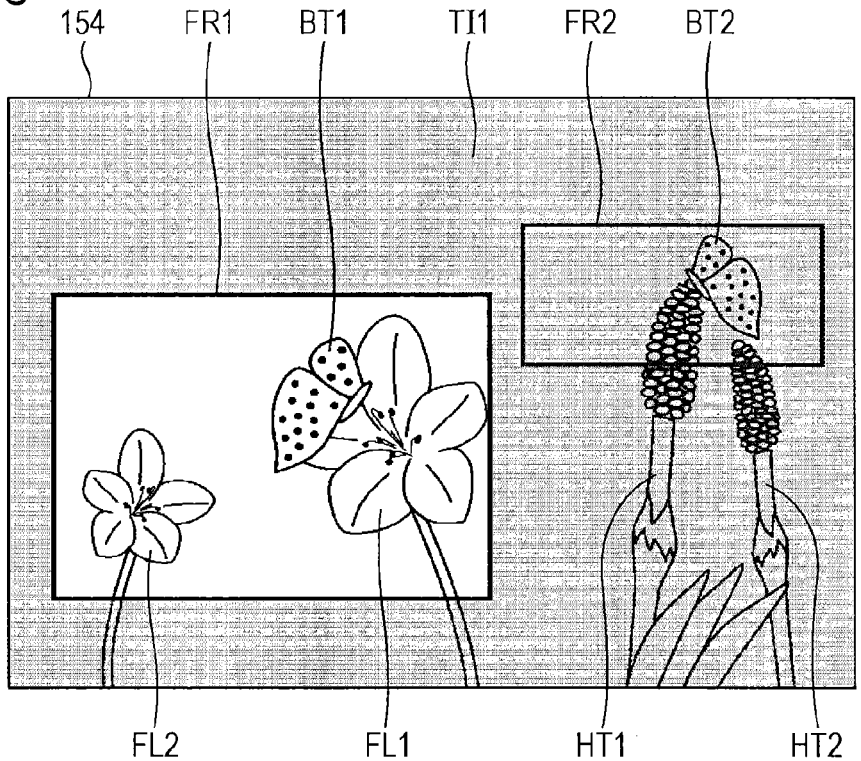
FIG. 6 is a diagram illustrating a display example of the monitor according to the first embodiment.

The display controller 1714 controls the main recommended composition FR1 and the recommended composition FR2 to be displayed distinguishably from each other. For example, as illustrated in FIG. 6, a region other than a region surrounded by the main recommended composition FR1 is displayed by semi-transparent grey (this display will be referred to as "grey-out display").

In the grey-out display, it is preferable that the recommended composition FR2 be recognized by the user. By displaying plural compositions, the user can recognize a composition which has yet to be recognized. For example, when the user images a human, the imaging apparatus 100 can provide an appropriate composition relating to a part of the background. When the user is satisfied with the main recommended composition FR1, the user only has to change the position, the angle of view, and the like of the imaging apparatus 100 based on the main recommended composition FR1.

However, when plural (recommended) compositions are suggested to the user, it is necessary that one composition be selected among the plural compositions. When the shutter button 113 is pressed, it is troublesome to perform the operation of selecting one composition among plural compositions. In addition, when descriptions and auxiliary lines of plural compositions are displayed, information displayed on the monitor 154 may be confused. In this example, the main recommended composition is changed according to the movement of the imaging apparatus 100.

For example, a case where the user is more satisfied with the recommended composition FR2 than the main recommended composition FR1 is assumed. The user moves the imaging apparatus 100 to the recommended composition FR2, that is, to the right. Along with the movement of the imaging apparatus 100, the through image stored in the RAM 174 is updated. New recommended compositions are set on the updated through image.

Figure 7:
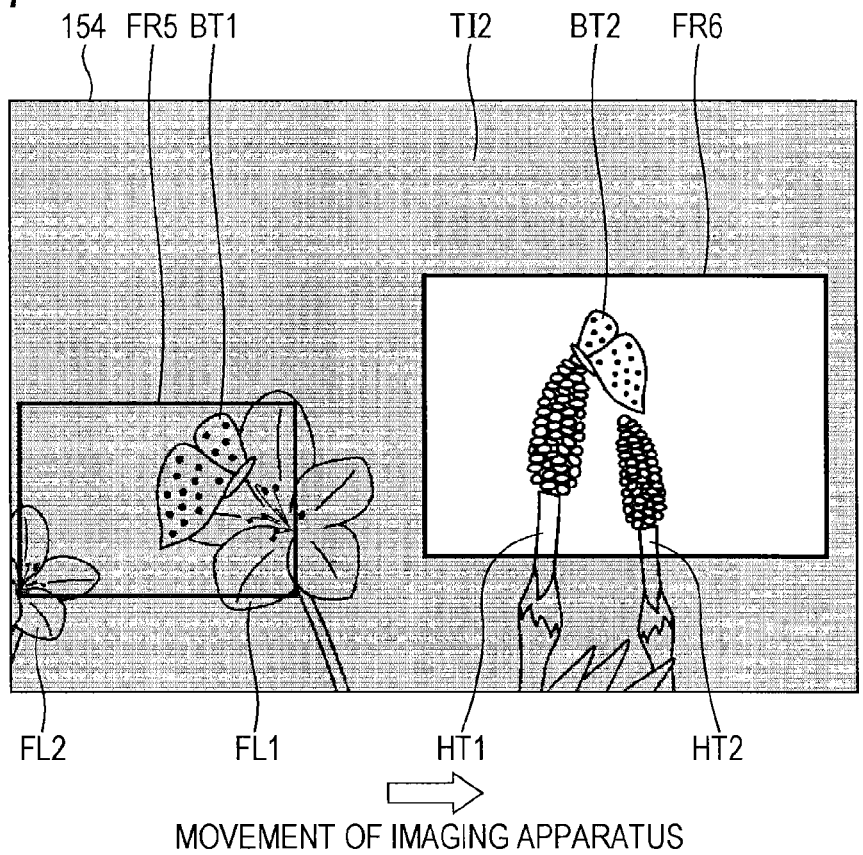
FIG. 7 is a diagram illustrating a display example of the monitor according to the first embodiment.

FIG. 7 illustrates one example of recommended compositions set on the updated through image (through image TI2). A recommended composition FR5 and a recommended composition FR6 are set on the through image TI2 by the composition determining unit 1712.

The movement detecting unit 1713 generates the movement information regarding the movement of the imaging apparatus 100 based on the sensor information supplied from the sensor 158. The display controller 1714 changes the main recommended composition with another recommended composition based on the movement information generated by the movement detecting unit 1713 and displays the changed main recommended composition. In this example, since the imaging apparatus 100 is moved to the right, the display controller 1714 sets a recommended composition positioned on the right, that is, sets the recommended composition FR6 as a main recommended composition. The display controller 1714 controls a region other than a region in the main recommended composition FR6 on the through image TI2 to be displayed by semi-transparent grey.

In this way, the main recommended composition is changed to follow the movement of the imaging apparatus 100, and the display is performed correspondingly. The user can recognize a recommended composition of interest (as a result, this recommended composition corresponds to the main recommended composition) by a natural operation without selecting a predetermined recommended composition among plural recommended compositions. Further, for example, by displaying the region other than the region in the main recommended composition with grey, the user can easily imagine an image to be captured in the main recommended composition.

Example of Process Flow

Figure 8:
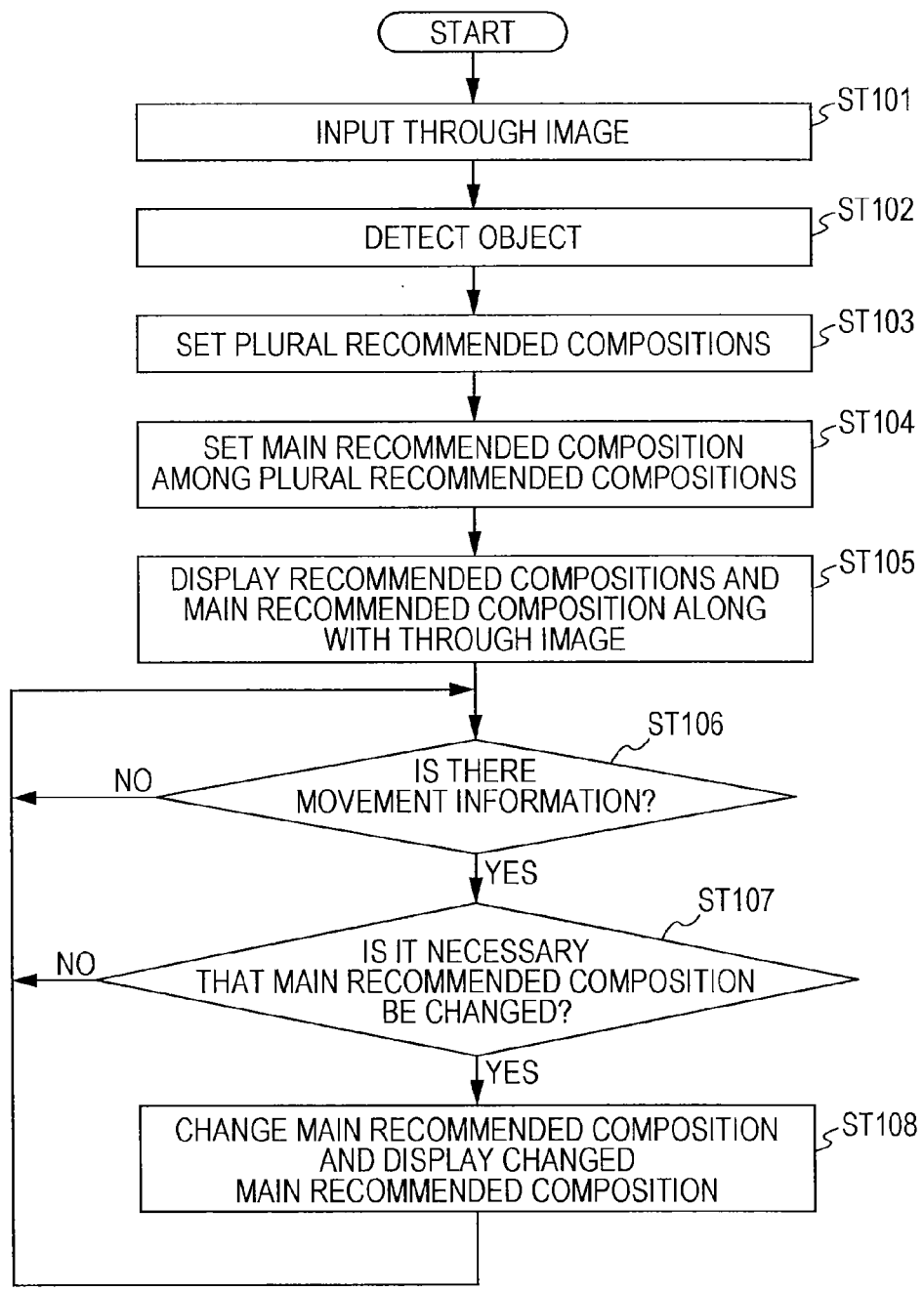
FIG. 8 is a flowchart illustrating an example of the process flow according to the first embodiment.

An example of a process flow according to the first embodiment will be described with reference to a flowchart of FIG. 8. Unless specified otherwise, the respective processes in the flowchart of FIG. 8 are executed by the processor 171 and the respective functions included in the processor 171.

In Step ST101, a through image which is obtained through the lens block 200 and the like is subjected to a predetermined signal processing is stored in the RAM 174. The process proceeds to Step ST102.

In Step ST102, an object is detected from the through image by the object detecting unit 1711. The process proceeds to Step ST103.

In Step ST103, plural recommended compositions are set such that the object detected in Step ST102 is appropriately positioned. The process proceeds to Step ST104.

In Step ST104, a main recommended composition is set among the plural recommended composition by the composition determining unit 1712. For example, a recommended composition close to the center of the through image is set to a default main recommended composition. The process proceeds to Step ST105.

In Step ST105, under the control of the display controller 1714, the recommended compositions and the main recommended composition are superimposed on the through image, and the superimposed image is displayed on the monitor 154. The display controller 1714 controls a region other than a region in the main recommended composition to be displayed by, for example, grey. The process proceeds to Step ST106.

In Step ST106, the display controller 1714 determines whether or not there is movement information regarding the movement of the imaging apparatus 100. The movement information includes the amount (movement amount) and the direction (movement direction) of the movement.

That is, the movement detecting unit 1713 generates the movement information regarding the movement of the imaging apparatus 100 based on the sensor information supplied from the sensor 158. The movement detecting unit 1713 supplies the generated movement information to the display controller 1714. The display controller 1714 determines whether or not the imaging apparatus 100 is moved based on whether or not there is the movement information. When the movement information is not input to the display controller 1714, the process returns to Step ST106, and the determination of Step ST106 is repeated. When the movement information is input to the display controller 1714, the process proceeds to Step ST107.

In Step ST107, whether or not it is necessary that the main recommended composition be changed is determined by the display controller 1714. When the movement amount of the imaging apparatus 100 indicated by the movement information is less than a predetermined movement amount (for example, the movement of the imaging apparatus 100 based on shaking), the display controller 1714 determines that it is not necessary that the main recommended composition be changed. The process returns to Step ST106, and the determination process of Step ST106 is repeated.

In the determination process of Step ST107, when the movement amount of the imaging apparatus 100 indicated by the movement information is greater than the predetermined movement amount, the display controller 1714 determines that it is necessary that the main recommended composition be changed. The process proceeds to Step ST108.

In Step ST108, the display controller 1714 changes the main recommended composition with another recommended composition and displays the changed main recommended composition and the like on the monitor 154. Specifically, along with the movement of the imaging apparatus 100, the through image stored in the RAM 174 is updated. New plural recommended compositions are set on the updated through image by the composition determining unit 1712. The display controller 1714 sets a recommended composition, which is positioned in a moving direction of the imaging apparatus 100 indicated by the movement information, to a main recommended composition. The display controller 1714 controls a region other than a region in the set main recommended composition to be displayed by grey.

2. Second Embodiment

Next, a second embodiment of the present disclosure will be described. The external appearance, the configurations, the functions, and the like of an imaging apparatus according to the second embodiment are the same as those of the imaging apparatus 100 according to the first embodiment. Therefore, the repetitive description will be appropriately omitted.

In the second embodiment, the composition determining unit 1712 of the processor 171 calculates an evaluation value of each composition. Based on the evaluation value of each composition, recommended compositions and a main recommended composition are set. For example, compositions which are determined to have an evaluation value of a threshold or higher are set to recommended compositions, and a composition having a highest evaluation value among the recommended compositions is set to a main recommended composition.

Example of Process Flow of Calculating Evaluation Value

Figure 9:
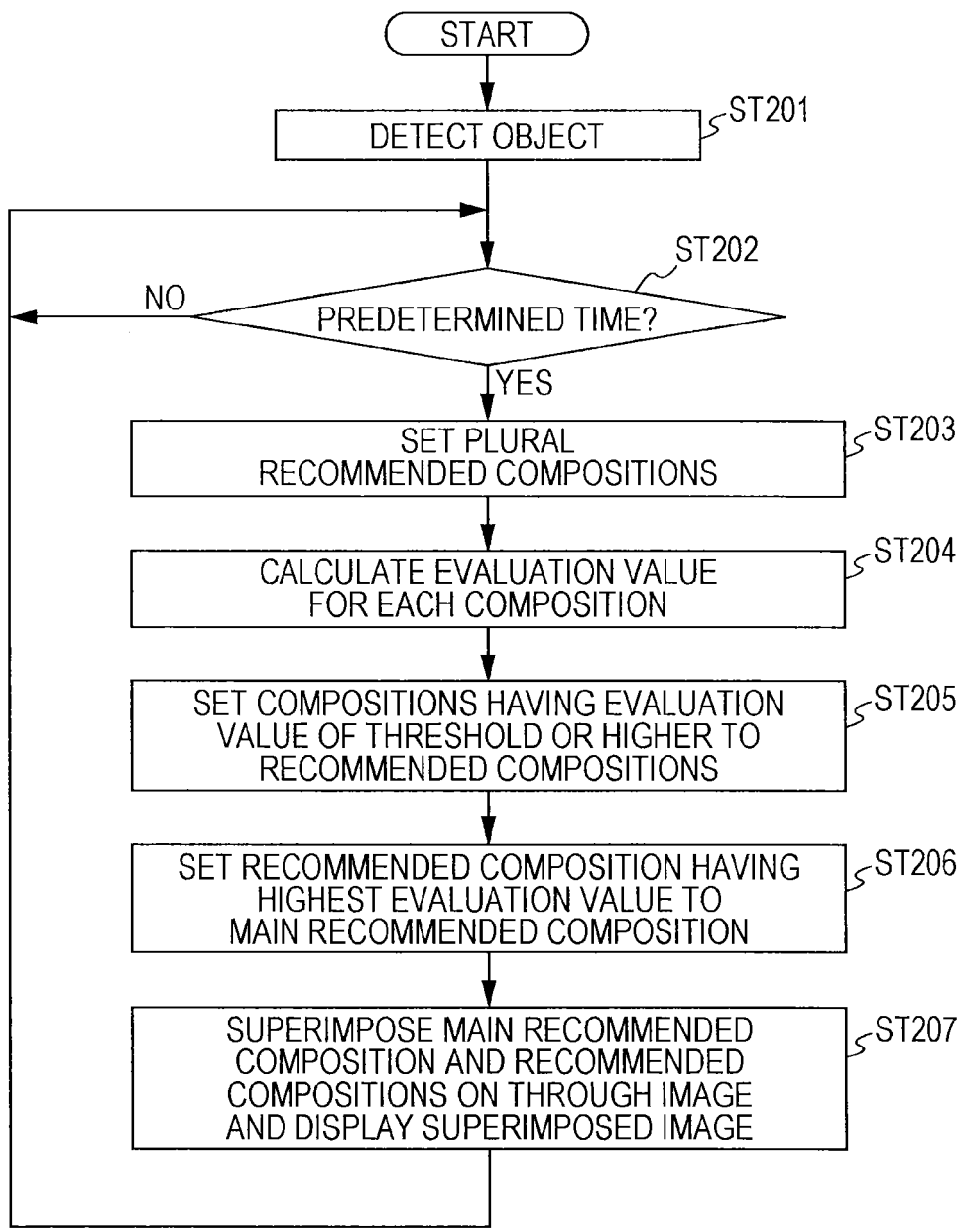
FIG. 9 is a flowchart illustrating an example of a method of setting a main recommended composition.

An example of a process flow of calculating an evaluation value will be described with reference to a flowchart of FIG. 9. Unless specified otherwise, the respective processes in the flowchart of FIG. 9 are executed by the processor 171 and the respective functions included in the processor 171.

In Step ST201, one or plural objects are detected from the through image by the object detecting unit 1711. The process proceeds to Step ST202.

In Step ST202, whether or not the time is a predetermined time is determined by the composition determining unit 1712. The predetermined time can be appropriately set. For example, a time whenever the through image as an example of the input image is stored in the RAM 174 or a time when the shutter button 113 is half-pressed can be set to the predetermined time. The object may be detected by the object detecting unit 1711 at the predetermined time of Step ST202. When the time is not the predetermined time, the process returns to Step ST202, and the process of Step ST202 is repeated. When the time is the predetermined time, the process proceeds to Step ST203.

In Step ST203, the composition determining unit 1712 sets plural compositions. The composition determining unit 1712 sets plural compositions such that the object detected by the object detecting unit 1711 is appropriately positioned in a composition according to the rule of thirds. The process proceeds to Step ST204.

In Step ST204, the composition determining unit 1712 calculates an evaluation value of each composition. The composition determining unit 1712 calculates the evaluation value, for example, by using at least one of a composition position and a composition size of the input image as a parameter.

In this example, the evaluation value E of each composition is calculated according to the following expression.

$$E = k1*f1 + k2*f2 \qquad (1)$$

In the expression (1), k1 and k2 represent a weight coefficient and can be appropriately set.

In the expression (1), f1 represents a value calculated based on a difference between the center of the angle of view (the center of the input image) of an imaging apparatus (imaging apparatus 100) and the center of a composition. As the center of the angle of view of the imaging apparatus and the center of a composition are close to each other, that is, as a distance between the center of the angle of view of the imaging apparatus and the center of a composition is decreased, an f1 value is set to be increased.

In the expression (1), f2 represents a value calculated based on a difference between the size of the monitor 154 and the size of a composition. As the difference between the size of the monitor 154 and the size of a composition is decreased, an f2 value is set to be increased.

By appropriately setting the weight coefficients in the expression (1), whether the difference between the center positions or the difference between the sizes is emphasized can be set. For example, a correction value calculated by the composition determining unit 1712 may also be added.

In the expression (1), as the center of a composition is closer to the center of the input image and the size of a composition is closer to the size of the monitor, the evaluation value is increased. The process proceeds to Step ST205.

In Step ST205, the composition determining unit 1712 sets recommended compositions according to the evaluation values. For example, the composition determining unit 1712 sets compositions having an evaluation value of a threshold or higher sets to recommended compositions. The process proceeds to Step ST206.

In Step ST206, the composition determining unit 1712 sets a main recommended composition among plural recommended compositions. For example, the composition determining unit 1712 sets a recommended composition having a highest evaluation value to a main recommended composition. The process proceeds to Step ST207.

In Step ST207, the display controller 1714 superimposes the main recommended composition and the recommended compositions on the through image and displays the superimposed image. For example, the display controller 1714 displays the main recommended composition and the recommended compositions using the grey-out display to be displayed distinguishably from each other. The process returns to Step ST202. In this way, a recommended composition having a highest evaluation value is suggested to the user as a default main recommended composition.

Figure 10:
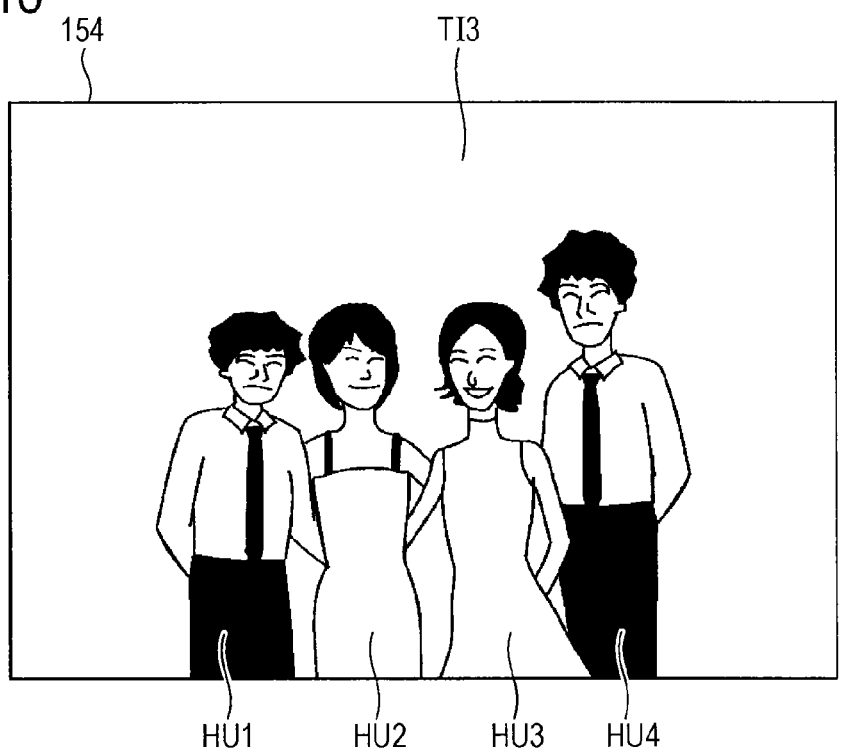
FIG. 10 is a diagram illustrating a display example of a monitor according to a second embodiment of the present disclosure.

Compositions are changed along with changes of the input image, and new evaluation values are set for the changed compositions. Along with the changes of the compositions and the evaluations values, the main recommended composition is updated. The evaluation value may be set based on an object in a composition. FIG. 10 is an example of the through image. The through image TI3 includes four humans (a human HU1, a human HU2, a human HU3, and a human HU4). Each human's face is detected by the object detecting unit 1711.

The composition determining unit 1712 sets recommended compositions such that each human's face is appropriately positioned. The composition determining unit 1712 sets a main recommended composition among the plural recommended compositions. In this example, as the number of humans' faces included in a recommended composition is increased, the evaluation value thereof is increased.

Figure 11:
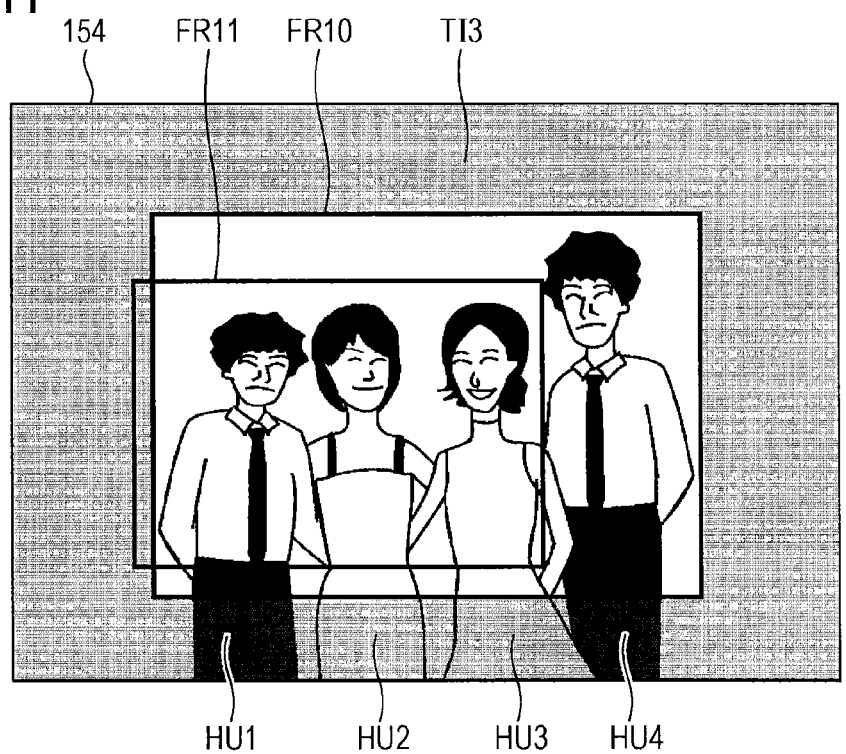
FIG. 11 is a diagram illustrating a display example of the monitor according to the second embodiment.

FIG. 11 illustrates an example of set recommended compositions. For example, a recommended composition FR10 including four humans' faces and a recommended composition FR11 including three humans' faces (the human HU1, the human HU2, and the human HU3) are set. The recommended composition FR10 including more humans' faces is set to a main recommended composition. A region out of the main recommended composition FR10 is displayed by grey.

Figure 12:
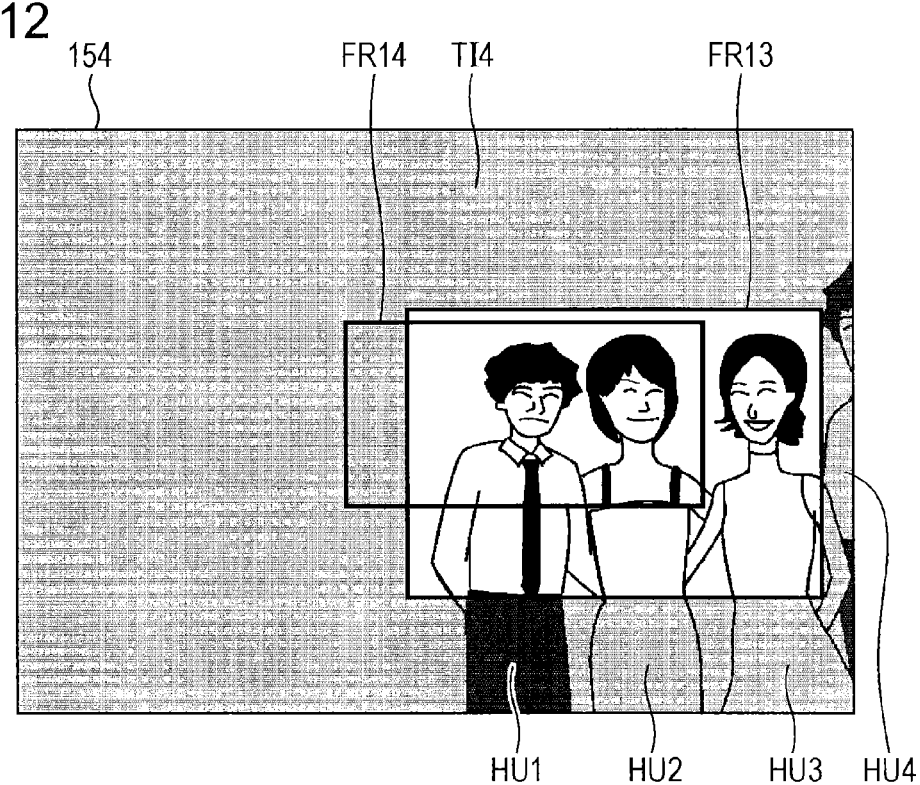
FIG. 12 is a diagram illustrating a display example of the monitor according to the second embodiment.

FIG. 12 illustrates an example of a through image TI4 displayed on the monitor 154 when the imaging apparatus 100 is moved, for example, to the left. Along with the movement of the imaging apparatus 100, the human HU4 is framed out of the through image. The face of the human HU4 is not detected by the object detecting unit 1711. When the object detected by the object detecting unit 1711 is changed, new recommended compositions and a new main recommended composition are set.

As illustrated in FIG. 12, for example, a recommended composition FR13 including three humans' faces (the human HU1, the human HU2, and the human HU3) and a recommended composition FR14 including two humans' faces (the human HU1 and the human HU2) are newly set. The recommended composition FR13 including more humans' faces is set as a main recommended composition. A region out of the main recommended composition FR13 is displayed by grey. In this way, the recommended compositions and the main recommended composition can be appropriately set according to changes of the object. The operation performed on the imaging apparatus may be enlargement or reduction by zoom. The recommended compositions and the main recommended composition are appropriately set according to the frame in or the frame out of the object.

Figure 13:
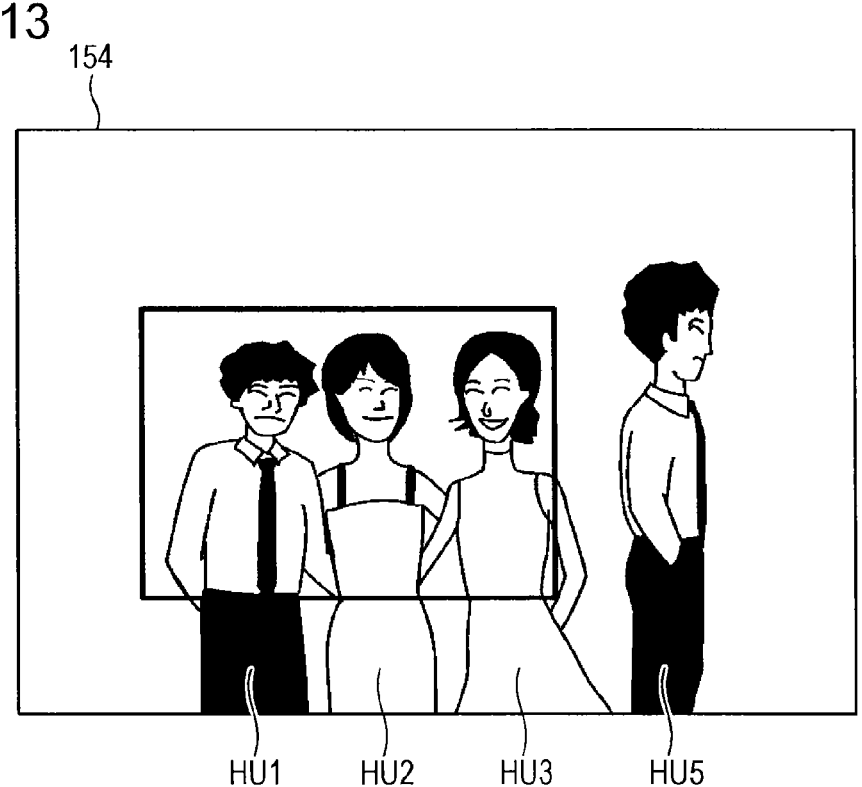
FIG. 13 is a diagram illustrating a display example of the monitor according to the second embodiment.

For example, as illustrated in FIG. 13, when a human HU5 who turns sideways is detected, a main recommended composition may be set such that the human HU5 is excluded. The human HU5 is, for example, a passer-by. As a result, an appropriate recommended composition from which a passer-by or the like is excluded can be suggested.

When one region is crowded with humans, a composition including an appropriate background may be set to a recommended composition. When plural faces are present in a wide range, a composition in which the center of a region including plural faces is positioned at the center may be set to a recommended composition.

Example of Process Flow

Figure 14:
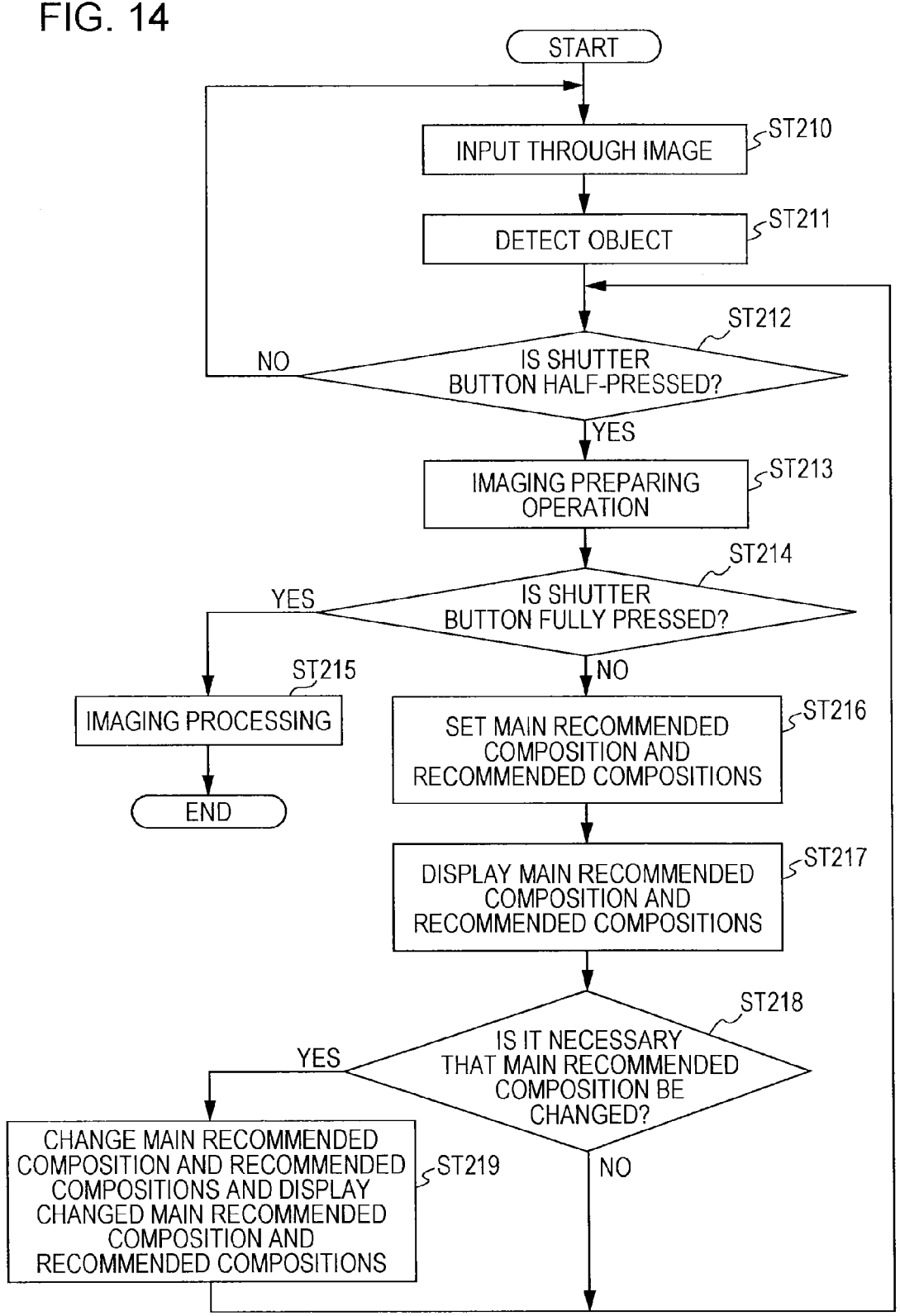
FIG. 14 is a flowchart illustrating an example of a process flow according to the second embodiment.

An example of a process flow according to the second embodiment will be described with reference to a flowchart of FIG. 14. Unless specified otherwise, the respective processes in the flowchart of FIG. 14 are executed by the processor 171 and the respective functions included in the processor 171.

In Step ST210, a through image is input, and the input through image is temporarily stored in the RAM 174. The process proceeds to Step ST211.

In Step ST211, an object is detected from the through image by the object detecting unit 1711. The process proceeds to Step ST212.

In Step ST212, whether or not the shutter button 113 is half-pressed is determined. This determination is performed by the processor 171 based on the manipulation operation supplied from the shutter button 113. When the shutter button 113 is not half-pressed, the process returns to Step ST210. When the shutter button 113 is half-pressed, the process proceeds to Step ST213.

In Step ST213, the imaging preparing operation is performed under the control of the processor 171. As the imaging preparing operation, a well-known processing such as focusing can be applied. The process proceeds to Step ST214.

In Step ST214, whether or not the shutter button 113 is fully pressed is determined. When the shutter button 113 is fully pressed, the process proceeds to Step ST215.

In Step ST215, a well-known imaging processing such as exposing is performed. Through this processing, a still image or a moving image is obtained, and the obtained still image or moving image is appropriately recorded on the recording device 155. The process ends. That is, when the shutter button 113 is fully pressed, a subject is imaged in an arbitrary composition set by the user, irrespective of the recommended compositions and the like.

In Step ST214, when the shutter button 113 is not fully pressed, the process proceeds to Step ST216. In Step ST216, when the shutter button 113 is half-pressed, the composition determining unit 1712 sets plural recommended compositions and sets a main recommended composition among the plural recommended compositions. The recommended compositions and the main recommended composition are set based on, for example, the above-described evaluation values. That is, in this example, while the shutter button 113 is half-pressed, the evaluation value of each composition is calculated, and the recommended compositions and the like are set. The process proceeds to Step ST217.

In Step ST217, under the control of the display controller 1714, the main recommended composition and the recommended compositions are superimposed on the through image, and the superimposed image is displayed. The main recommended composition and the recommended compositions are displayed distinguishably from each other. The process proceeds to Step ST218.

In Step ST218, whether or not it is necessary that the main recommended composition be changed is determined. For example, sequentially, compositions are set on the input through image, and the evaluation value of each composition is calculated. Recommended compositions are set according to the evaluation values. When a recommended composition having a highest evaluation value is changed, it is determined that it is necessary that the main recommended composition be changed. When it is determined that it is not necessary that the main recommended composition be changed, the process returns to Step ST212, and the determination process of Step ST212 is repeated. When it is determined that it is necessary that the main recommended composition be changed, the process proceeds to Step ST219.

In Step ST219, under the control of the display controller 1714, the main recommended composition and the recommended compositions are changed, and the changed main recommended composition and the changed recommended compositions are displayed. The process returns to Step ST212, and the determination process of Step ST212 is repeated.

As described above, in the second embodiment, for example, the evaluation value of each composition is calculated, and the main recommended composition and the recommended compositions are set according to the evaluation values. When the evaluation values are changed along with the movement of the imaging apparatus and the like, optionally, the main recommended composition and the recommended compositions are changed, and the changed main recommended composition and the changed recommended compositions are displayed.

Modification Example of Second Embodiment

A modification example of the second embodiment will be described. For convenience of description, one modification example will be described below. However, the modification example described below can be applied to the first embodiment and other embodiments in addition to the second embodiment. In this modification example, when the main recommended composition is not changed during a predetermined period of time, relevant information relating to the main recommended composition is displayed.

Figure 15:
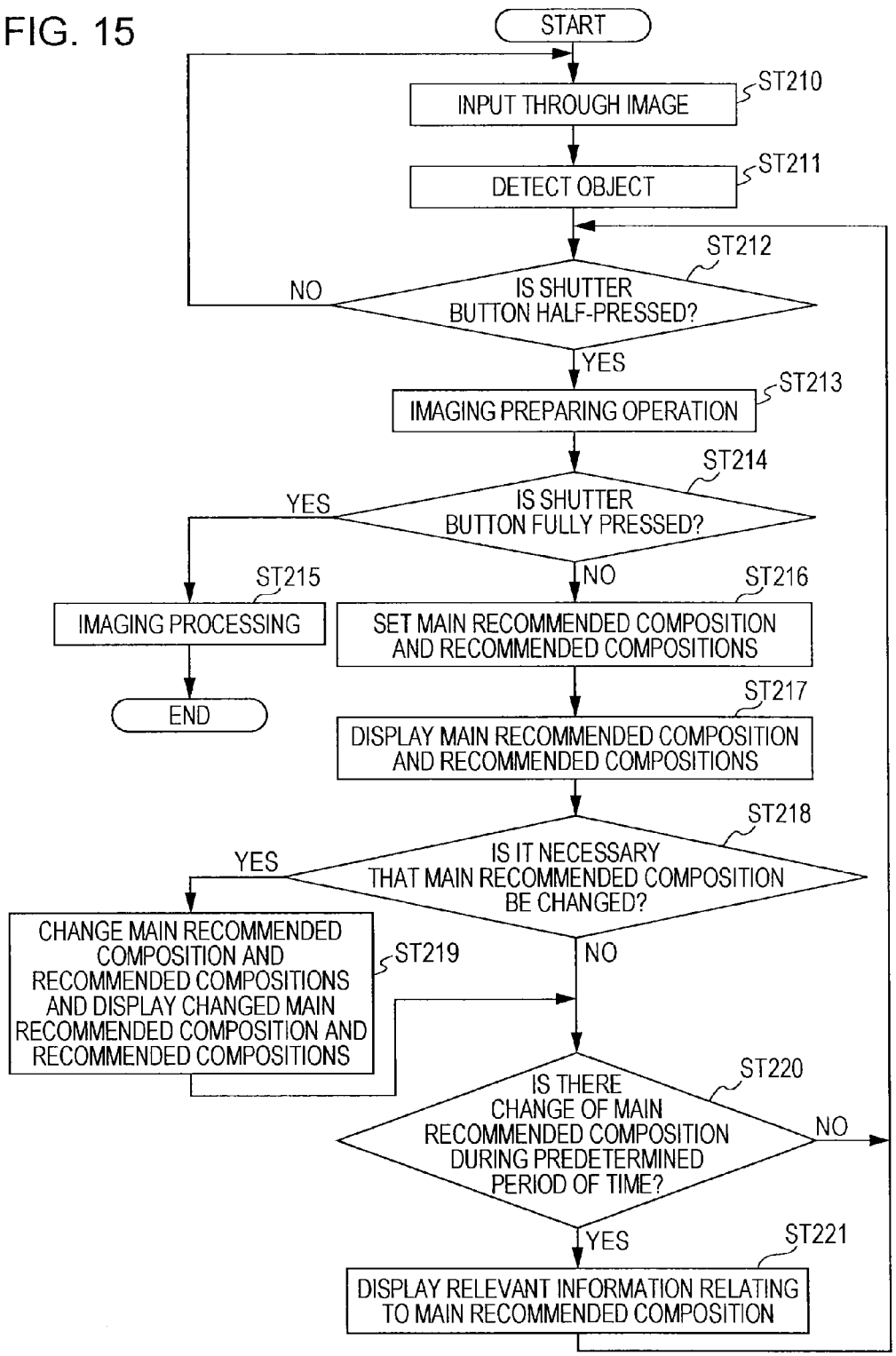
FIG. 15 is a flowchart illustrating an example of a process flow according to a modification example of the second embodiment.

An example of a process of the modification example will be described with reference to a flowchart of FIG. 15. Since the processes from Step ST210 to Step ST219 of FIG. 15 are the same as the corresponding processes of FIG. 14, the repetitive descriptions will be appropriately omitted.

In the process of Step ST218 or Step ST219, the main recommended composition and the recommended compositions are set. The process proceeds to Step ST220.

In Step ST220, whether or not there is a change of the main recommended composition during a predetermined period of time is determined. When there is a change of the main recommended composition during the predetermined period of time, the process returns to Step ST212. When there is no change of the main recommended composition during the predetermined period of time, the process proceeds to Step ST221. The predetermined period of time can be appropriately set, for example, several seconds.

No change of the main recommended composition during the predetermined period of time implies that, for example, the arrangement and the like of the object are not substantially changed, and the imaging apparatus 100 is not substantially moved. In this case, the processor 171 determines that the user is interested in the suggested main recommended composition. In Step ST221, the display controller 1714 reads, for example, relevant information relating to the main recommended composition from the composition DB 157 and displays the relevant information. When there is no change of the main recommended composition during the predetermined period of time, for example, the recommended compositions may be deleted, and only the relevant information relating to the main recommended composition may be superimposed on the through image, and the superimposed image may be displayed.

Figure 16:
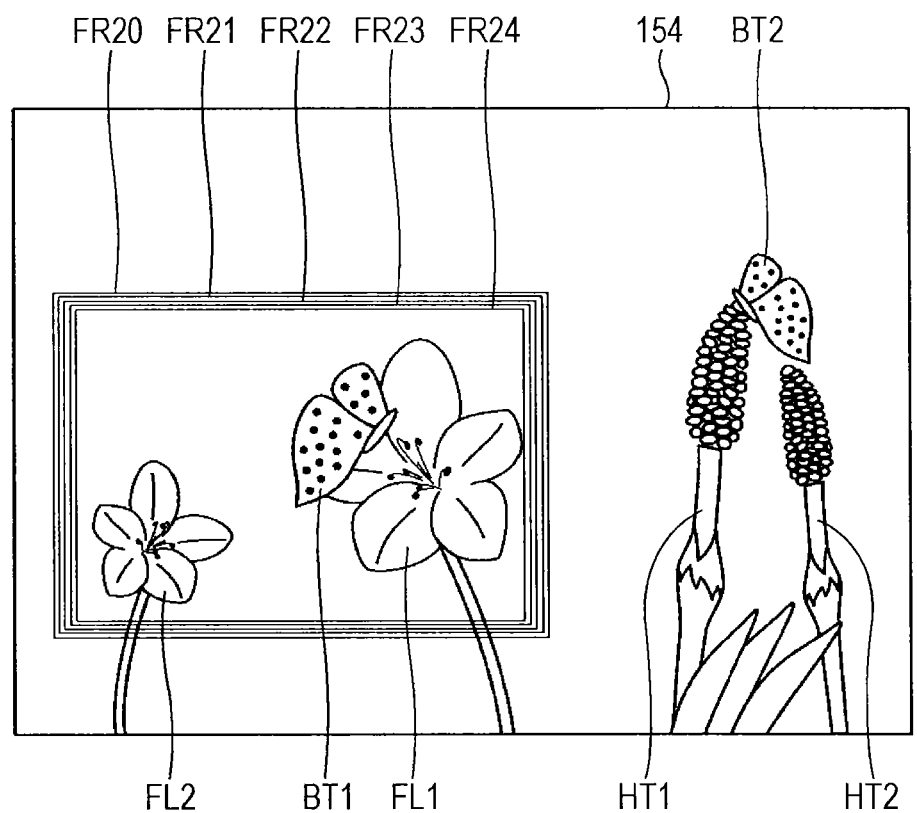
FIG. 16 is a diagram illustrating a display example of a monitor according to the modification example of the second embodiment.

The relevant information relating to the main recommended composition is, for example, guidance information for guiding the main recommended composition. FIG. 16 illustrates an example of the guidance information. The guidance information includes, for example, a frame FR20 corresponding to the main recommended composition and four frames (referred to as a frame FR21, a frame FR22, a frame FR23, and a frame FR24 in descending order of the frame size, respectively) which are reduced to a appropriate scale.

For example, the respective frames are sequentially displayed in order of frame FR20→frame FR21→frame FR22→frame FR23→frame FR24. Subsequent to the frame FR24, the frame FR20 is displayed again, and the above-described display is repeated. The display is changed between the respective frames at intervals of, for example, several milliseconds. Through this display, the guidance display from the front to the back (in the depth direction of the monitor 154) can be suggested to the user. By moving to the front or the like or by performing the zoom operation according to this guidance display, the user can image a subject based on the main recommended composition.

In this way, the guidance to the main recommended composition can be performed by the natural operation of the user without selecting the main recommended composition. The guidance information illustrated in FIG. 16 is merely an example, and the guidance information is not limited to this example. The relevant information relating to the main recommended composition is not limited to the guidance information. Support information for imaging a subject in the main recommended composition may be displayed. For example, a composition dividing line or various guides and auxiliary lines can be displayed for realizing the main recommended composition. Since relevant information relating to recommended compositions other than the main recommended composition is not displayed, the display on the monitor can be easily recognized by the user.

3. Third Embodiment

Next, a third embodiment of the present disclosure will be described. The external appearance, the configurations, the functions, and the like of an imaging apparatus according to the third embodiment are the same as those of the imaging apparatus 100 according to the first embodiment. Therefore, the repetitive description will be appropriately omitted.

In the third embodiment, for example, a composition which should be initially imaged is set as a main recommended composition. For example, "1" which indicates the first imaging order is displayed near the main recommended composition. By assigning different imaging orders to the main recommended composition and the recommended compositions, respectively, the main recommended composition and the recommended compositions can be displayed distinguishably from each other.

Example of Display in Third Embodiment

Figure 17:
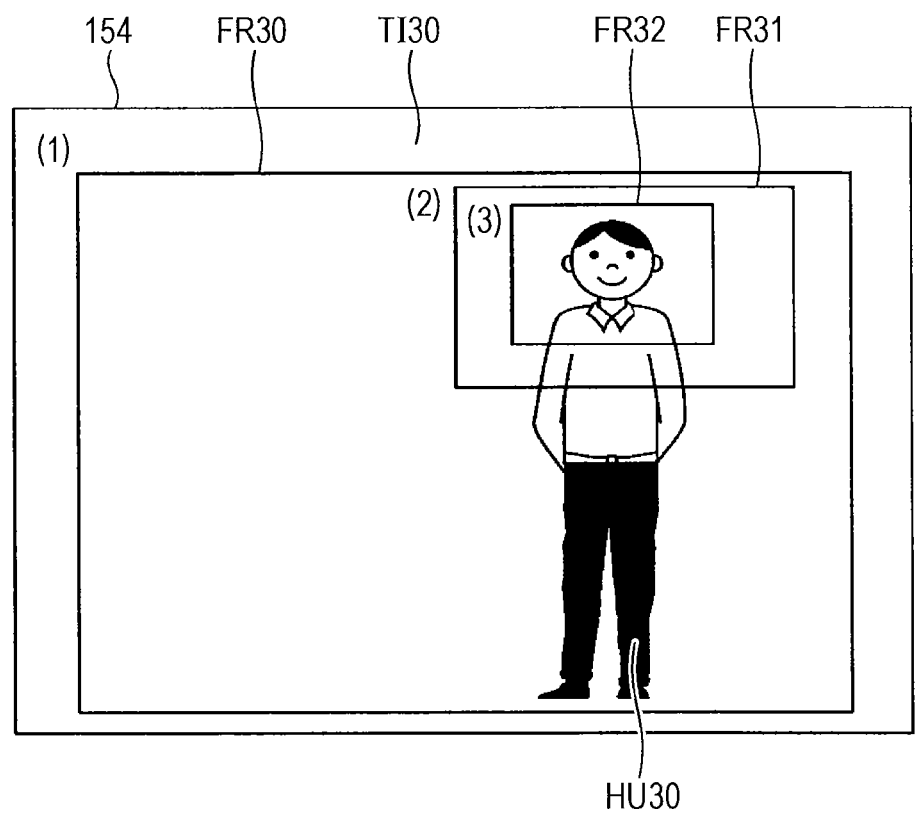
FIG. 17 is a diagram illustrating a display example of a monitor according to a third embodiment of the present disclosure.

FIG. 17 illustrates an example of a through image displayed on the monitor 154. A through image TI30 includes the entire body of a human HU30. The human HU30 is detected by the object detecting unit 1711.

The composition determining unit 1712 sets plural recommended compositions on the through image TI30. The composition determining unit 1712 sets plural recommended compositions such that the same human can be imaged in a variety of compositions. For example, a full-shot recommended composition FR30 for imaging the entire body of the human HU30, a bust-shot recommended composition FR31 for imaging the upper body above the breast of the human HU30, and a close-up-shot recommended composition FR32 for imaging a region around the face of the human HU30 are set by the composition determining unit 1712.

Next, the composition determining unit 1712 determines the imaging orders and sets a recommended composition which should be initially imaged to a main recommended composition. For example, the full-shot recommended composition FR30 is set to a main recommended composition, "1" indicating the imaging order is displayed near the main recommended composition. To other recommended compositions, information regarding the imaging orders is assigned. For example, "2" is displayed near the recommended composition FR31, and "3" is displayed near the recommended composition FR32.

For example, according to the imaging orders, the user sequentially images the human HU30 after approaching to the human HU30, zooming, panning, and the like. As a result, the user can obtain a series of images in appropriate compositions. Further, it is avoidable for the user to forget to capture an image at an appropriate composition.

For example, when the imaging of the human HU30 based on the recommended composition FR30 which is an example of the main recommended composition is finished, the recommended composition FR30 may be deleted. The recommended composition FR31 is set to a main recommended composition, "1" may be displayed near the recommended composition FR31, and "2" may be displayed near the recommended composition FR32.

In addition, for example, when an operation of the user to image the human HU30 based on the recommended composition FR32 is performed before imaging the human HU30 based on the recommended composition FR31, the display may be performed according to the operation of the user. For example, when the user of the imaging apparatus 100 approaches the human HU30 before imaging the human HU30 based on the recommended composition FR31, the recommended composition FR31 may be deleted, and the recommended composition FR32 may be displayed as a main recommend composition.

Figure 18:
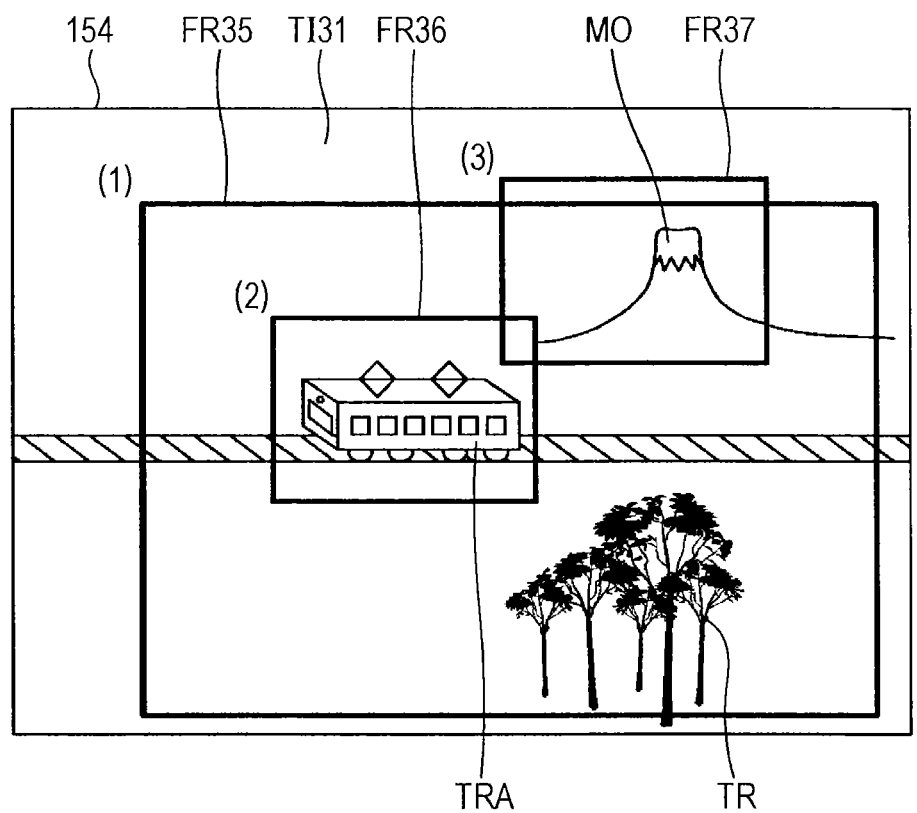
FIG. 18 is a diagram illustrating a display example of the monitor according to the third embodiment.

Of course, the third embodiment can be applied to a landscape in addition to the human. FIG. 18 illustrates an example of a through image displayed on the monitor 154. The through image TI31 includes, for example, a train TRA, a tree TR, and a mountain MO.

A recommended composition for imaging a full view and recommended compositions for imaging the individual subjects are set. For example, a recommended composition FR35 for imaging the full view, a recommended composition FR36 for imaging the train TRA, and a recommended composition FR37 for imaging the mountain MO are set and displayed. For example, "1" is displayed near the recommended composition FR35, "2" is displayed near the recommended composition FR36, and "3" is displayed near the recommended composition FR37. For example, the user can capture images in appropriate compositions relating to the individual subjects after imaging the full view. By imaging the full view, an image showing a relationship between the individual subjects and the full view of the individual subjects can be recorded.

Example of Process Flow

Figure 19:
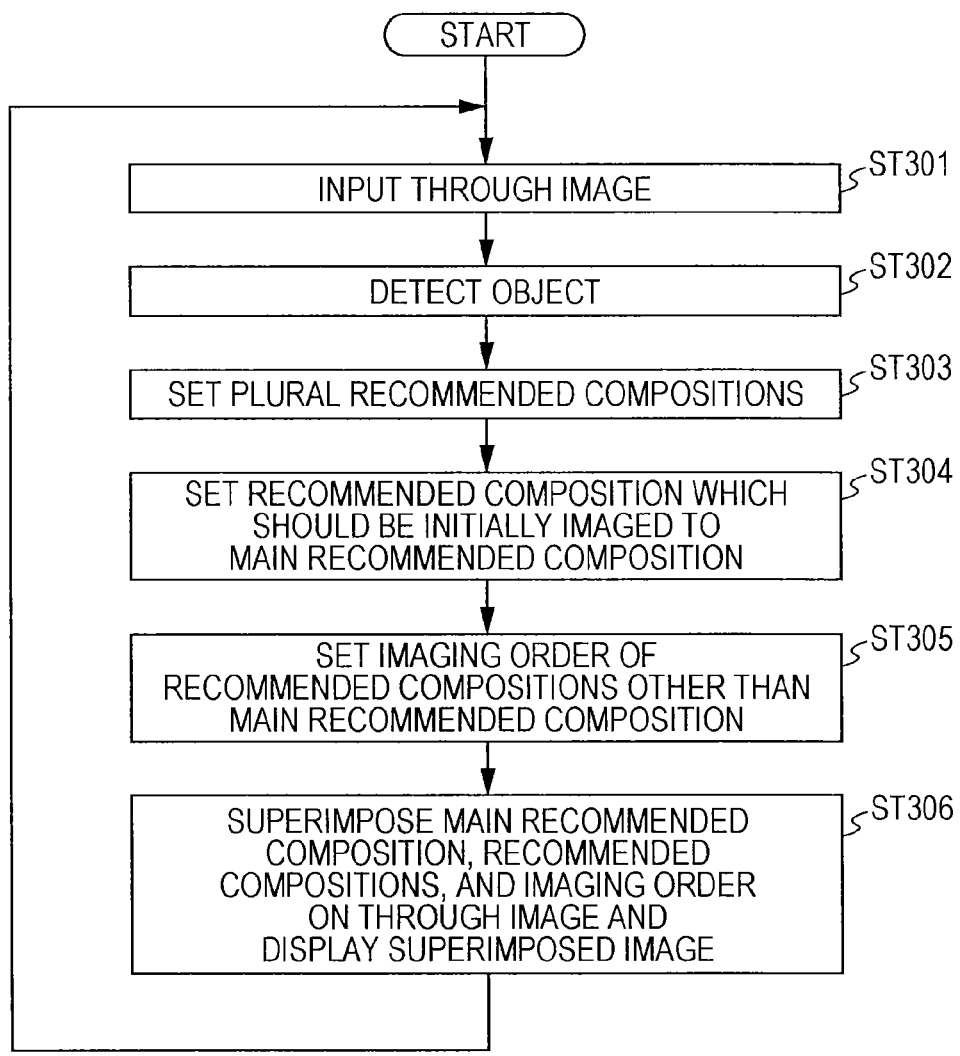
FIG. 19 is a flowchart illustrating an example of a process flow according to the third embodiment.

An example of a process flow according to the third embodiment will be described with reference to a flowchart of FIG. 19. Unless specified otherwise, the respective processes in the flowchart of FIG. 19 are executed by the processor 171 and the respective functions included in the processor 171.

In Step S301, a through image is input, and the input through image is stored in the RAM 174. The process proceeds to Step ST302.

In Step ST302, an object is detected from the through image stored in the RAM 174 by the object detecting unit 1711. As a method of detecting the object, an existing method can be applied. The process proceeds to Step ST303.

In Step ST303, the composition determining unit 1712 sets plural recommended compositions. For example, when the entire body of a human is detected through the object detection of Step ST302, a full-shot recommended composition, a bust-shot recommended composition, and a close-up-shot recommended composition are set. The process proceeds to Step ST304.

In Step ST304, the composition determining unit 1712 sets a recommended composition which should be initially imaged to a main recommended composition. For example, a full-shot recommended composition is set to a main recommended composition. The process proceeds to Step ST305.

In Step ST305, the composition determining unit 1712 sets imaging orders of recommended compositions (for example, the bust-shot recommended composition and the close-upshot recommended composition) other than the main recommended composition. The process proceeds to Step ST306.

In Step ST306, the display controller 1714 superimposes the main recommended composition, the recommended compositions, and the imaging orders on the through image and displays the superimposed image. Image data regarding the imaging orders is recorded on, for example, the composition DB 157. Under the control of the display controller 1714, for example, "1" is displayed near the main recommended composition to be distinguishable from other recommended compositions. The imaging orders may be displayed by characters instead of numbers.

Although not illustrated in FIG. 19, the main recommended composition may be changed according to the manipulation on the imaging apparatus 100 and the like. For example, when the imaging of a subject based on a main recommended composition is finished, the main recommended composition is deleted, and a recommended composition to which "2" is assigned is newly set to a main recommended composition and displayed. For example, when the processor 171 detects a manipulation such as the adjustment of the angle of view and the full-pressing operation of the shutter button 113, whether or not the imaging of a subject based on the main recommended composition is finished can be determined.

Further, for example, a user interface which is slidable in two directions may be displayed on the monitor 154 such that the main recommended composition can be changed by manipulating the user interface in one direction.

4. Modification Example

Hereinabove, the embodiments of the present disclosure have been described in detail. However, the present disclosure is not limited to these embodiments, and various modifications can be made based on the technical concept of the present disclosure.

In the above-described embodiments, the through image obtained through the imaging unit has been described as an example of the input image, but the input image is not limited thereto. For example, an image (a moving image or a still image) stored in a memory or an image obtained through the network such as the Internet may be used.

The method of displaying the main recommended composition and the recommended compositions distinguishably from each other is not limited to the grey-out display. For example, the main recommended composition may be turned on and off for the display. Alternatively, the main recommended composition and the recommended compositions may be colored by different colors, respectively, for the display.

The number and the shape of the recommended compositions are not limited to the above-described embodiments and can be appropriately changed. Plural main recommended compositions may also be set.

The configurations and the processes according to the embodiments and the modification examples can be appropriately combined within a range where there is no technical contradiction. The order of the respective processes in the exemplary process flows can be appropriately modified within a range where there is no technical contradiction.

The present disclosure may be implemented by an imaging apparatus including all or some of the functions described in the first to third embodiments may be used. For example, in the third embodiment, in addition to the imaging orders, the grey-out display may be performed as in the case of the first embodiment. In addition, a process corresponding to the detected object may be performed. For example, when plural humans are detected as the object, the processes according to the second embodiment may be performed, and when a landscape or the entire body of a human is detected as the object, the processes according to the third embodiment may be performed.

When the main recommended composition and the like are set, an imaging history may be reflected thereon. The imaging history can be determined based on, for example, images recorded on a recording device. For example, when more images of individual subjects than full view images are recorded on a recording device, a composition relating to an individual subject may be set as a main recommended composition or a recommended composition rather than a composition relating to a full view.

The display control device according to an embodiment of the present disclosure can be applied to not only imaging apparatuses but personal computers, smart phones, tablet PCs, and the like. Further, the display control device according to an embodiment of the present disclosure can be applied to not only household imaging apparatuses but monitoring imaging apparatuses, on-vehicle imaging apparatuses, and the like.

An embodiment of the present disclosure may be implemented not only by an apparatus but by a method, a program, a system, and the like. The program can be provided to the user, for example, through the network or through a portable memory such as an optical disc or a semiconductor memory.

In this case, the form of the program is not limited as long as it has the function of the program, and examples thereof include an object codes, a program executed by an interpreter, and script data supplied to OS.

Examples of a recording medium for supplying the program include magnetic recording mediums such as a flexible disc, a hard disc, or a magnetic tape; optical or magneto-optic recording mediums such as a magneto-optic disk (MO), a CD-ROM, a CD-R (Recordable), a CD-RW (Rewritable), a DVD-ROM, a DVD-R, or a DVD-RW; and non-volatile semiconductor memories.

Examples of a method of supplying the program using a wired or radio communication include a method of storing a data file (program data file) in a server on a computer network and downloading the program data file to a client computer connected to the server, in which the data file is a computer program which implements the content of the present disclose on the client computer, for example, a computer program itself implementing the content of the present disclosure or a compressed file having a self-installation function. In this case, the program data file may be divided into plural segment files such that the segment files are stored in different servers.

The present disclosure can be applied to a so-called cloud system in which the exemplary processes are executed by plural apparatuses by distributed processing. An embodiment of the present disclosure may be implemented by a system for implementing the exemplary processes according to the embodiment and the modification examples, that is, an apparatus for implementing at least a part of the exemplary processes.

The present disclosure can adopt the following configurations.

(1) A display control device including:

a composition determining unit that determines a plurality of recommended compositions of an input image; and a display controller that controls one recommended composition to be displayed distinguishably from other recommended compositions among the plurality of recommended compositions.

(2) The display control device according to (1),
in which the display controller changes the one recommended composition with another recommended composition according to input movement information and displays the changed recommended composition.

(3) The display control device according to (1) or (2),
in which the composition determining unit calculates an evaluation value for each composition, and
the display controller sets the one recommended composition according to the evaluation value.

(4) The display control device according to (3),
in which the composition determining unit calculates the evaluation value at a predetermined time, and
the display controller sets the one recommended composition according to the calculated evaluation value.

(5) The display control device according to (4),
in which the composition determining unit calculates the evaluation value when the input image is input.

(6) The display control device according to (4),
in which the composition determining unit calculates the evaluation value when a shutter button is half-pressed.

(7) The display control device according to any one of (2) to (6),
in which the display controller sets compositions having an evaluation value higher than a threshold to recommended compositions and sets a composition having a highest evaluation value to the one recommended composition.

(8) The display control device according to any one of (2) to (7),
in which the composition determining unit calculates the evaluation value by using at least one of a composition position and a composition size of the input image as a parameter.

(9) The display control device according to any one of (2) to (6),
in which the composition determining unit calculates the evaluation value such that the evaluation value is increased along with an increase in the number of human faces in a composition.

(10) The display control device according to any one of (1) to (9),
in which the display controller assigns different imaging orders to the one recommended composition and the other recommended compositions to be displayed.

(11) The display control device according to any one of (1) to (10),
in which when the one recommended composition is not changed during a predetermined period of time, relevant information relating to the one recommended composition is displayed.

(12) The display control device according to (11),
in which the relevant information is guidance information for guiding the one recommended composition.

(13) A display control method including:
allowing a composition determining unit to determine a plurality of recommended compositions of an input image; and
allowing a display controller to control one recommended composition to be displayed distinguishably from other recommended compositions among the plurality of recommended compositions.

(14) A program which allows a computer to execute a display control method, the display control method including:
allowing a composition determining unit to determine a plurality of recommended compositions of an input image; and
allowing a display controller to control one recommended composition to be displayed distinguishably from other recommended compositions among the plurality of recommended compositions.

(15) An imaging apparatus including:
an imaging unit;
a composition determining unit that determines a plurality of recommended compositions of an input image acquired through the imaging unit; and
a display controller that controls one recommended composition to be displayed distinguishably from other recommended compositions among the plurality of recommended compositions.

It should be understood by those skilled in the art that various modifications, combinations, sub-combinations and alterations may occur depending on design requirements and other factors insofar as they are within the scope of the appended claims or the equivalents thereof.

What is claimed is:

1. A display control device comprising:
circuitry configured to
determine a main recommended composition of an input image; and
control displaying of guidance information to guide a user to use the main recommended composition in a predetermined repetition manner in a predetermined direction in a vicinity of the main recommended composition,
wherein the guidance information is a plurality of area/frame indications wrapping around an area of the main recommended composition, and
wherein the predetermined repetition manner includes recursively displaying the area/frame indications such that the plurality of area/frame indications recursively change size.

2. The display control device according to claim 1,
wherein the circuitry is configured to change the main recommended composition with another recommended composition according to input movement information and to display the changed main recommended composition.

3. The display control device according to claim 1,
wherein the circuitry is configured to calculate an evaluation value for each composition and to set the one recommended composition according to the evaluation value.

4. The display control device according to claim 3,
wherein the circuitry is configured to calculate the evaluation value at a predetermined time and to set the one recommended composition according to the calculated evaluation value.

5. The display control device according to claim 4,
wherein the circuitry is configured to calculate the evaluation value when the input image is input.

6. The display control device according to claim 4,
wherein the circuitry is configured to calculate the evaluation value when a shutter button is half-pressed.

7. The display control device according to claim 3,
wherein the circuitry is configured to set compositions having an evaluation value higher than a threshold to recommended compositions and to set a composition having a highest evaluation value to the main recommended composition.

8. The display control device according to claim 3,
wherein the circuitry is configured to calculate the evaluation value by using at least one of a composition position and a composition size of the input image as a parameter.

9. The display control device according to claim 3,
wherein the circuitry is configured to calculate the evaluation value such that the evaluation value is increased along with an increase in the number of human faces in a composition.

10. The display control device according to claim 1,
wherein the circuitry is configured to assign different imaging orders to the one recommended composition and the other recommended compositions to be displayed.

11. The display control device according to claim 1,
wherein the circuitry is configured such that when the one recommended composition is not changed during a predetermined period of time, relevant information relating to the one recommended composition is displayed.

12. The display control device according to claim 11,
wherein the relevant information is guidance information for guiding the one recommended composition.

13. The display control device according to claim 1, wherein the predetermined direction is a depth direction of a monitor view.

14. A display control method comprising:
determining, in circuitry, a main recommended composition of an input image; and
controlling, in the circuitry, displaying of guidance information to guide a user to use the main recommended composition in a predetermined repetition manner in a predetermined direction in a vicinity of the main recommended composition,
wherein the guidance information is a plurality of area/frame indications wrapping around an area of the main recommended composition, and
wherein the predetermined repetition manner includes recursively displaying the area/frame indications such that the plurality of area/frame indications recursively change size.

15. A non-transitory computer-readable medium having stored thereon instructions that, when executed on a computing device, control the computing device to:
determine a main recommended composition of an input image; and
control displaying of guidance information to guide a user to use the main recommended composition in a predetermined repetition manner in a predetermined direction in a vicinity of the main recommended composition,
wherein the guidance information is a plurality of area/frame indications wrapping around an area of the main recommended composition, and
wherein the predetermined repetition manner includes recursively displaying the area/frame indications such that the plurality of area/frame indications recursively change size.

16. An imaging apparatus comprising:
an imaging unit; and
circuitry configured to
determine a main recommended composition of an input image acquired through the imaging unit; and
control displaying of guidance information to guide a user to use the main recommended composition in a predetermined repetition manner in a predetermined direction in a vicinity of the main recommended composition,
wherein the guidance information is a plurality of area/frame indications wrapping around an area of the main recommended composition, and
wherein the predetermined repetition manner includes recursively displaying the area/frame indications such that the plurality of area/frame indications recursively change size.

* * * * *